United States Patent
Gao et al.

(10) Patent No.: US 11,722,192 B2
(45) Date of Patent: Aug. 8, 2023

(54) INTERFERENCE MEASUREMENT METHOD, USER EQUIPMENT AND NETWORK SIDE DEVICE

(71) Applicant: CHINA ACADEMY OF TELECOMMUNICATIONS TECHNOLOGY, Beijing (CN)

(72) Inventors: Qiubin Gao, Beijing (CN); Runhua Chen, Beijing (CN); Rakesh Tamrakar, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 90 days.

(21) Appl. No.: 16/651,985

(22) PCT Filed: Sep. 19, 2018

(86) PCT No.: PCT/CN2018/106443
§ 371 (c)(1),
(2) Date: Mar. 27, 2020

(87) PCT Pub. No.: WO2019/062617
PCT Pub. Date: Apr. 4, 2019

(65) Prior Publication Data
US 2020/0266865 A1     Aug. 20, 2020

(30) Foreign Application Priority Data
Sep. 29, 2017    (CN) .......................... 201710911276.9

(51) Int. Cl.
*H04B 7/06*     (2006.01)
*H04B 17/345*     (2015.01)
(Continued)

(52) U.S. Cl.
CPC ......... *H04B 7/0626* (2013.01); *H04B 17/345* (2015.01); *H04L 5/0005* (2013.01); *H04L 5/0057* (2013.01); *H04W 24/10* (2013.01)

(58) Field of Classification Search
None
See application file for complete search history.

(56) References Cited

U.S. PATENT DOCUMENTS

| 2003/0016621 A1* | 1/2003 | Li | ........................ H04L 27/261 370/203 |
| 2010/0002801 A1* | 1/2010 | Jia | ........................ H04B 7/0456 375/296 |

(Continued)

FOREIGN PATENT DOCUMENTS

| CN | 102196580 A | 9/2011 |
| CN | 104105120 A | 10/2014 |

(Continued)

OTHER PUBLICATIONS

First Office Action and Search Report from CN app. No. 201710911276.9, dated Jan. 6, 2020, with English translation from Global Dossier.

(Continued)

*Primary Examiner* — Scott M Sciacca
(74) *Attorney, Agent, or Firm* — Ladas & Parry, LLP

(57) ABSTRACT

The present disclosure provides an interference measurement method, a UE and a network side device. The interference measurement method includes: receiving, by the UE, configuration information about an interference measurement reference signal resource and an interference measurement parameter from a network side device; receiving, by the UE, an interference measurement reference signal on the interference measurement reference signal resource based on the configuration information; and calculating, by the UE, an interference estimation value of an interference (Continued)

```
receiving, by a UE, configuration information about an interference        ┌─ 201
measurement reference signal resource and an interference measurement
parameter from a network side device receiving, by the UE, an interference measurement reference signal on      ┌─ 202
the interference measurement reference signal resource based on the
configuration information calculating, by the UE, an interference estimation value of an             ┌─ 203
interference signal based on the interference measurement parameter and
the interference measurement reference signal
``` signal based on the interference measurement parameter and the interference measurement reference signal.

9 Claims, 4 Drawing Sheets

(51) Int. Cl.
*H04L 5/00* (2006.01)
*H04W 24/10* (2009.01)

(56) References Cited

U.S. PATENT DOCUMENTS

| | | |
|---|---|---|
| 2010/0203912 A1 | 8/2010 | Ashikhmin et al. |
| 2013/0301432 A1 | 11/2013 | Hammarwall et al. |
| 2013/0336214 A1 | 12/2013 | Sayana et al. |
| 2013/0344909 A1 | 12/2013 | Davydov et al. |
| 2014/0126404 A1 | 5/2014 | Kim et al. |
| 2014/0301271 A1 | 10/2014 | Xu et al. |
| 2015/0003275 A1 | 1/2015 | Krishnamurthy |
| 2015/0245234 A1 | 8/2015 | Roy et al. |
| 2015/0263796 A1* | 9/2015 | Nam ............... H04L 5/0094 370/329 |
| 2015/0327095 A1* | 11/2015 | Kwak ............... H04W 24/08 370/252 |
| 2015/0381244 A1 | 12/2015 | Byun et al. |
| 2016/0036542 A1 | 2/2016 | Gong et al. |
| 2017/0338878 A1 | 11/2017 | Gao et al. |
| 2018/0212662 A1* | 7/2018 | Ren ............... H04B 7/0634 |
| 2021/0185706 A1* | 6/2021 | Park ............... H04L 5/00 |

FOREIGN PATENT DOCUMENTS

| | | | |
|---|---|---|---|
| CN | 104284361 A | 1/2015 | |
| CN | 105680999 A | 6/2016 | |
| CN | 106856461 A | 6/2017 | |
| EP | 2869519 A1 | 5/2015 | |
| JP | 2016-524353 A1 | 8/2016 | |
| WO | WO-2016078478 A1 * | 5/2016 | ........... H04B 7/0639 |

OTHER PUBLICATIONS

First Office action and search report from TW app. No. 107133574, dated Aug. 7, 2020, with machine English translation.
International Search Report from PCT/CN2018/106443, dated Dec. 11, 2018, with English translation from WIPO.
Written Opinion of the International Searching Authority from PCT/CN2018/106443, dated Dec. 11, 2018, with English translation from WIPO.
International Preliminary Report on Patentability from PCT/CN2018/106443, dated Mar. 31, 2020, with English translation from WIPO.
Extended European Search Report from EP app. No. 18860800.4, dated Oct. 14, 2020.
Fourth Office Action for European Patent Application 18 860 800.4, dated Jul. 7, 2022.
Japanese Office Action for Japanese Patent Application 2020-517891 dated Apr. 12, 2022 and English translation provided by Global dossier.
"Consideration on Interference estimation in NR" 3GPP TSG RAN WG1 Meeting NR#3, R1-1715804, Nagoya, Japan, Sep. 18-21, 2017, Source: CATT, Agenda 6.2.2.6.

* cited by examiner

INTERFERENCE MEASUREMENT METHOD, USER EQUIPMENT AND NETWORK SIDE DEVICE

CROSS-REFERENCE TO RELATED APPLICATIONS

The present application is the U.S. national phase of PCT Application No. PCT/CN2018/106443 filed on Sep. 19, 2018, which claims a priority to the Chinese patent application No. 201710911276.9 filed on Sep. 29, 2017, the disclosures of which are incorporated herein by reference in their entireties.

TECHNICAL FIELD

The present disclosure relates to the field of communication technology, in particular to an interference measurement method, a User Equipment (UE), and a network side device.

BACKGROUND

In a communication system, usually a UE needs to perform interference measurement, e.g., the measurement and calculation of a Channel Quality Indicator (CQI) or a Rank Indicator (RI) depends on the interference measurement performed by the UE. Currently, during the interference measurement, a dedicated interference measurement resource is configured by a network side device for the UE, and the interference measurement is performed by the UE on the corresponding interference measurement resource based on the configuration information from the network side device. However, merely the configuration information about the interference measurement resource is acquired by the UE during the interference measurement, resulting in relatively low interference measurement accuracy.

SUMMARY

An object of the present disclosure is to provide an interference measurement method, a UE and a network side device, so as to solve the problem in the related art where the interference measurement accuracy is relatively low.

In one aspect, the present disclosure provides in some embodiments an interference measurement method, including: receiving, by a UE, configuration information about an interference measurement reference signal resource and an interference measurement parameter from a network side device; receiving, by the UE, an interference measurement reference signal on the interference measurement reference signal resource based on the configuration information; and calculating, by the UE, an interference estimation value of an interference signal based on the interference measurement parameter and the interference measurement reference signal.

In a possible embodiment of the present disclosure, the interference measurement parameter is used to indicate a spatial feature and/or a strength feature of the interference signal.

In a possible embodiment of the present disclosure, the strength feature includes power information or amplitude information about the interference signal corresponding to at least one antenna port for the interference measurement reference signal.

In a possible embodiment of the present disclosure, the power information is a ratio of power of the interference signal to power of the interference measurement reference signal, and the amplitude information is a ratio of an amplitude of the interference signal to an amplitude of the interference measurement reference signal.

In a possible embodiment of the present disclosure, the spatial feature of the interference signal includes a correlation matrix or a precoding matrix for the transmission of the interference signal.

In a possible embodiment of the present disclosure, the correlation matrix is a diagonal matrix, and each element on each diagonal line has a non-zero value or has a value of zero. Merely one element in each column of the precoding matrix has a non-zero value, and the other elements in the column each have a value of zero.

In a possible embodiment of the present disclosure, the non-zero value is a constant, or the non-zero value is a value determined by the UE based on signaling from the network side device. The non-zero value in the correlation matrix is the same as or different from the non-zero value in the precoding matrix.

In a possible embodiment of the present disclosure, the interference measurement parameter is indication information about at least one matrix in at least two $N_p*N_p$ matrices; or the interference measurement parameter is indication information about n antenna ports in $N_p$ antenna ports, where $0<n\leq N_p$; or the interference measurement parameter is the correlation matrix for the transmission of the interference signal; or the interference measurement parameter is indication information about k vectors in $N_p$ vectors having a dimension of $N_p*1$, merely one element in each vector having a non-zero value, the other elements in the vector each having a value of zero, where k is an integer greater than or equal to 1; or the interference measurement parameter is indication information about at least one matrix in Q matrices, the Q matrices including matrices having dimensions of $N_p*1, N_p*2, N_p*3, \ldots, N_p*Q$ respectively, $Q\leq N_p$, merely one element in each column of each matrix having a non-zero value and the other elements in the column of the matrix having a value of zero, or merely one element in each column of each matrix having a non-zero value, the other elements in the column of the matrix having a value of zero, and merely one element in each row of each matrix having a non-zero value, and the other elements in the row of the matrix having a value of zero, where Np represents the quantity of transmission antenna ports for the interference measurement reference signal.

In a possible embodiment of the present disclosure, the calculating, by the UE, the calculating, by the UE, the interference estimation value of the interference signal based on the interference measurement parameter and the interference measurement reference signal includes determining, by the UE, a correlation matrix for the reception of the interference signal based on the interference measurement parameter and the interference measurement reference signal, and calculating the interference estimation value of the interference signal using the correlation matrix for the reception of the interference signal.

In a possible embodiment of the present disclosure, the determining, by the UE, the correlation matrix for the reception of the interference signal based on the interference measurement parameter and the interference measurement reference signal and calculating the interference estimation value of the interference signal using the correlation matrix for the reception of the interference signal includes: determining, by the UE, the correlation matrix for the reception of the interference signal on each subcarrier or Resource Element (RE) within a measurement bandwidth based on the interference measurement parameter and the interference measurement reference signal, performing an averaging operation on the correlation matrices for the reception of the interference signal on all the subcarriers or REs within the measurement bandwidth, and calculating the interference estimation value of the interference signal based on a result of the averaging operation; or performing, by the UE, channel estimation using the interference measurement reference signal, determining the correlation matrix for the reception of the interference signal based on a channel estimation value and the interference measurement parameter, and calculating the interference estimation value of the interference signal using the correlated matrix for the reception of the interference signal; or determining, by the UE, antenna ports for the interference measurement based on the interference measurement parameter, performing channel estimation on the antenna ports for the interference measurement using the interference measurement reference signal, determining the correlation matrix for the reception of the interference signal based on a channel estimation value, and calculating the interference estimation value of the interference signal using the correlation matrix for the reception of the interference signal.

In a possible embodiment of the present disclosure, the performing, by the UE, the channel estimation using the interference measurement reference signal, determining the correlation matrix for the reception of the interference signal based on the channel estimation value and the interference measurement parameter and calculating the interference estimation value of the interference signal using the correlation matrix for the reception of the interference signal includes: performing, by the UE, the channel estimation using the interference measurement reference signal to acquire the channel estimation value H, determining the correlation matrix R for the transmission of the interference signal using the interference measurement parameter, determining the correlation matrix for the reception of the interference signal as $R_{rr}=HRH^H$, and calculating the interference estimation value of the interference signal using $R_{rr}$; or performing, by the UE, the channel estimation using the interference measurement reference signal to acquire the channel estimation value H, determining a power matrix P of the interference signal using the interference measurement parameter, determining the correlation matrix for the reception of the interference signal as $R_{rr}=HPH^H$, and calculating the interference estimation value of the interference signal using $R_{rr}$. The determining, by the UE, the antenna ports for the interference measurement based on the interference measurement parameter, performing the channel estimation on the antenna ports for the interference measurement using the interference measurement reference signal, determining the correlation matrix for the reception of the interference signal based on the channel estimation value and calculating the interference estimation value of the interference signal using the correlation matrix for the reception of the interference signal includes determining, by the UE, the antenna ports for the interference measurement based on the interference measurement parameter, performing the channel estimation on the antenna ports for the interference measurement using the interference measurement reference signal to acquire the channel estimation value $H_i$, determining the correlation matrix for the reception of the interference signal as $R_{rr}=H_iH_i^H$, and calculating the interference estimation value of the interference signal using $R_{rr}$, where $(\ )^H$ represents conjugate transposition.

In a possible embodiment of the present disclosure, the determining the correlation matrix R for the transmission of the interference measurement reference signal using the interference measurement parameter includes: when the interference measurement parameter is the indication information about one matrix in the at least two $N_p*N_p$ matrices, determining the matrix indicated by the interference measurement parameter as the correlation matrix R for the transmission of the interference signal; when the interference measurement parameter is the indication information about at least two matrices in the at least two $N_p*N_p$ matrices, determining a sum of the at least two matrices indicated by the interference measurement parameter as the correlation matrix R for the transmission of the interference signal; when the interference measurement parameter is the indication information about n antenna ports in the $N_p$ antenna ports, constructing a diagonal matrix having a dimension of $N_p$ as the correlation matrix R for the transmission of the interference signal, each of elements on each diagonal line of the diagonal matrix and corresponding to the antenna ports indicated by the interference measurement parameter having a non-zero value, and the other elements each having a value of zero; or when the interference measurement parameter is the correlation matrix for the transmission of the interference signal, determining the correlation matrix as the correlation matrix R for the transmission of the interference signal; or when the interference measurement parameter is the indication information about k vectors in $N_p$ vectors having a dimension of $N_p*1$, determining the correlation matrix for the transmission of the interference signal as $R=v_1v_1^H+v_2v_2^H+\ldots+v_kv_k^H$, where $v_i$ represents an ith codeword indicated by the interference measurement parameter, and i=1, 2, 3, ..., k; or when the interference measurement parameter is the indication information about one matrix in Q matrices, determining the correlation matrix R for the transmission of the interference signal as $R=VV^H$, where V represents the matrix indicated by the interference measurement parameter; or when the interference measurement parameter is the indication information about m matrices in Q matrices, determining the correlation matrix R for the transmission of the interference signal as $R=V_1V_1^H+\ldots+V_mV_m^H$, where $V_i$ represents an ith matrix indicated by the interference measurement parameter, i=1, ..., m, and m is an integer greater than or equal to 2.

In a possible embodiment of the present disclosure, the determining, by the UE, the antenna ports for the interference measurement based on the interference measurement parameter includes: when the interference measurement parameter is the indication information about at least one matrix in at least two $N_p*N_p$ matrices, determining antenna ports corresponding to elements each having a non-zero value on each diagonal line of the matrix indicated by the interference measurement parameter as the antenna ports for the interference measurement; or when the interference measurement parameter is the indication information about n antenna ports in $N_p$ antenna ports, determining the n antenna ports indicated by the interference measurement parameter as the antenna ports for the interference measurement; or when the interference measurement parameter is the correlation matrix for the transmission of the interference measurement reference signal, determining antenna ports corresponding to elements each having a non-zero value on each diagonal line of the correlation matrix indicated by the interference measurement parameter as the antenna ports for the interference measurement; or when the interference measurement parameter is the indication information about k vectors in $N_p$ vectors having a dimension of $N_p*1$, determining antenna ports corresponding to elements each having a non-zero value in the k vectors as the antenna ports for the interference measurement; or when the interference measurement parameter is the indication information about at least one matrix in Q matrices, determining antenna ports corresponding to elements each having a non-zero value in the matrix indicated by the interference measurement parameter as the antenna ports for the interference measurement.

In a possible embodiment of the present disclosure, the interference measurement method further includes calculating Channel State Information (CSI) based on the interference estimation value, and feeding back the CSI to the network side device.

In another aspect, the present disclosure provides in some embodiments an interference measurement method, including: generating, by a network side device, configuration information about an interference measurement reference signal resource and an interference measurement parameter; and transmitting, by the network side device, the configuration information and the interference measurement parameter to a UE, so that the UE calculates an interference estimation value of an interference signal based on the interference measurement parameter and an interference measurement reference signal.

In a possible embodiment of the present disclosure, the interference measurement parameter is used to indicate a spatial feature and/or a strength feature of the interference signal.

In a possible embodiment of the present disclosure, the strength feature includes power information or amplitude information about the interference signal corresponding to at least one antenna port for the interference measurement reference signal.

In a possible embodiment of the present disclosure, the power information is a ratio of power of the interference signal to power of the interference measurement reference signal, and the amplitude information is a ratio of an amplitude of the interference signal to an amplitude of the interference measurement reference signal.

In a possible embodiment of the present disclosure, the spatial feature of the interference signal includes a correlation matrix or a precoding matrix for the transmission of the interference signal.

In a possible embodiment of the present disclosure, the correlation matrix is a diagonal matrix, and each element on each diagonal line has a non-zero value or has a value of zero. Merely one element in each column of the precoding matrix has a non-zero value, and the other elements in the column each have a value of zero.

In a possible embodiment of the present disclosure, the non-zero value is a constant, or the non-zero value is a value determined by the UE based on signaling from the network side device. The non-zero value in the correlation matrix is the same as or different from the non-zero value in the precoding matrix.

In a possible embodiment of the present disclosure, the interference measurement parameter is indication information about at least one matrix in at least two $N_p*N_p$ matrices; or the interference measurement parameter is indication information about n antenna ports in $N_p$ antenna ports, where $0<n\le N_p$; or the interference measurement parameter is the correlation matrix for the transmission of the interference signal; or the interference measurement parameter is indication information about k vectors in $N_p$ vectors having a dimension of $N_p*1$, merely one element in each vector having a non-zero value, the other elements in the vector each having a value of zero, where k is an integer greater than or equal to 1; or the interference measurement parameter is indication information about at least one matrix in Q matrices, the Q matrices including matrices having dimensions of $N_p*1$, $N_p*2$, $N_p*3$, ..., $N_p*Q$ respectively, $Q\le N_p$, merely one element in each column of each matrix having a non-zero value and the other elements in the column of the matrix having a value of zero, or merely one element in each column of each matrix having a non-zero value, the other elements in the column of the matrix having a value of zero, and merely one element in each row of each matrix having a non-zero value, and the other elements in the row of the matrix having a value of zero, where Np represents the quantity of transmission antenna ports for the interference measurement reference signal.

In a possible embodiment of the present disclosure, the interference measurement method further includes receiving, by the network side device, CSI from the UE, the CSI being calculated by the UE based on the interference estimation value.

In yet another aspect, the present disclosure provides in some embodiments a UE, including: a first reception module configured to receive configuration information about an interference measurement reference signal resource and an interference measurement parameter from a network side device; a second reception module configured to receive an interference measurement reference signal on the interference measurement reference signal resource based on the configuration information; and a calculation module configured to calculate an interference estimation value of an interference signal based on the interference measurement parameter and the interference measurement reference signal.

In a possible embodiment of the present disclosure, the interference measurement parameter is used to indicate a spatial feature and/or a strength feature of the interference signal.

In a possible embodiment of the present disclosure, the spatial feature of the interference signal includes a correlation matrix or a precoding matrix for the transmission of the interference signal.

In a possible embodiment of the present disclosure, the calculation module is further configured to determine a correlation matrix for the reception of the interference signal based on the interference measurement parameter and the interference measurement reference signal, and calculate the interference estimation value of the interference signal using the correlation matrix for the reception of the interference signal.

In a possible embodiment of the present disclosure, the calculation module is further configured to: perform channel estimation using the interference measurement reference signal, determine the correlation matrix for the reception of the reference signal based on a channel estimation value and the interference measurement parameter, and calculate the interference estimation value of the interference signal using the correlation matrix for the reception of the interference signal; or determine antenna ports for the interference measurement based on the interference measurement parameter, perform channel estimation on the antenna ports for the interference measurement using the interference measurement reference signal, determine the correlation matrix for the reception of the interference signal based on a channel estimation value, and calculate the interference estimation value of the interference signal using the correlation matrix for the reception of the interference signal.

In still yet another aspect, the present disclosure provides in some embodiments a network side device, including: a generation module configured to generate configuration information about an interference measurement reference signal resource and an interference measurement parameter; and a transmission module configured to transmit the configuration information and the interference measurement parameter to a UE, so that the UE calculates an interference estimation value of an interference signal based on the interference measurement parameter and an interference measurement reference signal.

In a possible embodiment of the present disclosure, the interference measurement parameter is used to indicate a spatial feature and/or a strength feature of the interference signal.

In still yet another aspect, the present disclosure provides in some embodiments a UE, including a transceiver, a memory, a processor, and a computer program stored in the memory and executed by the processor. The transceiver is configured to receive configuration information about an interference measurement reference signal resource and an interference measurement parameter from a network side device, receive an interference measurement reference signal on the interference measurement reference signal resource based on the configuration information, and calculate an interference estimation value of an interference signal based on the interference measurement parameter and the interference measurement reference signal; or the transceiver is configured to receive configuration information about an interference measurement reference signal resource and an interference measurement parameter from a network side device and receive an interference measurement reference signal on the interference measurement reference signal resource based on the configuration information, and the processor is configured to read the computer program in the memory so as to calculate an interference estimation value of an interference signal based on the interference measurement parameter and the interference measurement reference signal.

In a possible embodiment of the present disclosure, the interference measurement parameter is used to indicate a spatial feature and/or a strength feature of the interference signal.

In a possible embodiment of the present disclosure, the strength feature includes power information or amplitude information about the interference signal corresponding to at least one antenna port for the interference measurement reference signal.

In a possible embodiment of the present disclosure, the power information is a ratio of power of the interference signal to power of the interference measurement reference signal, and the amplitude information is a ratio of an amplitude of the interference signal to an amplitude of the interference measurement reference signal.

In a possible embodiment of the present disclosure, the spatial feature of the interference signal includes a correlation matrix or a precoding matrix for the transmission of the interference signal.

In a possible embodiment of the present disclosure, the correlation matrix is a diagonal matrix, and each element on each diagonal line has a non-zero value or has a value of zero. Merely one element in each column of the precoding matrix has a non-zero value, and the other elements in the column each have a value of zero.

In a possible embodiment of the present disclosure, the non-zero value is a constant, or the non-zero value is a value determined by the UE based on signaling from the network side device. The non-zero value in the correlation matrix is the same as or different from the non-zero value in the precoding matrix.

In a possible embodiment of the present disclosure, the interference measurement parameter is indication information about at least one matrix in at least two $N_p*N_p$ matrices; or the interference measurement parameter is indication information about n antenna ports in $N_p$ antenna ports, where $0<n\leq N_p$; or the interference measurement parameter is the correlation matrix for the transmission of the interference signal; or the interference measurement parameter is indication information about k vectors in $N_p$ vectors having a dimension of $N_p*1$, merely one element in each vector having a non-zero value, the other elements in the vector each having a value of zero, where k is an integer greater than or equal to 1; or the interference measurement parameter is indication information about at least one matrix in Q matrices, the Q matrices including matrices having dimensions of $N_p*1, N_p*2, N_p*3, \ldots, N_p*Q$ respectively, $Q\leq N_p$, merely one element in each column of each matrix having a non-zero value and the other elements in the column of the matrix having a value of zero, or merely one element in each column of each matrix having a non-zero value, the other elements in the column of the matrix having a value of zero, and merely one element in each row of each matrix having a non-zero value, and the other elements in the row of the matrix having a value of zero, where Np represents the quantity of transmission antenna ports for the interference measurement reference signal.

In a possible embodiment of the present disclosure, when calculating the interference estimation value of the interference signal based on the interference measurement parameter and the interference measurement reference signal, the transceiver or the processor is further configured to determine a correlation matrix for the reception of the interference signal based on the interference measurement parameter and the interference measurement reference signal, and calculate the interference estimation value of the interference signal using the correlation matrix for the reception of the interference signal.

In a possible embodiment of the present disclosure, when determining the correlation matrix for the reception of the interference signal based on the interference measurement parameter and the interference measurement reference signal and calculating the interference estimation value of the interference signal using the correlation matrix for the reception of the interference signal, the transceiver or the processor is further configured to: determine the correlation matrix for the reception of the interference signal on each subcarrier or RE within a measurement bandwidth based on the interference measurement parameter and the interference measurement reference signal, perform an averaging operation on the correlation matrices for the reception of the interference signal on all the subcarriers or REs within the measurement bandwidth, and calculate the interference estimation value of the interference signal based on a result of the averaging operation; or perform channel estimation using the interference measurement reference signal, determine the correlation matrix for the reception of the interference signal based on a channel estimation value and the interference measurement parameter, and calculate the interference estimation value of the interference signal using the correlated matrix for the reception of the interference signal; or determine antenna ports for the interference measurement based on the interference measurement parameter, perform channel estimation on the antenna ports for the interference measurement using the interference measurement reference signal, determine the correlation matrix for the reception of the interference signal based on a channel estimation value, and calculate the interference estimation value of the interference signal using the correlation matrix for the reception of the interference signal.

In a possible embodiment of the present disclosure, when performing the channel estimation using the interference measurement reference signal, determining the correlation matrix for the reception of the interference signal based on the channel estimation value and the interference measurement parameter and calculating the interference estimation value of the interference signal using the correlation matrix for the reception of the interference signal, the transceiver or the processor is further configured to: perform the channel estimation using the interference measurement reference signal to acquire the channel estimation value H, determine the correlation matrix R for the transmission of the interference signal using the interference measurement parameter, determine the correlation matrix for the reception of the interference signal as $R_{rr}=HRH^H$, and calculate the interference estimation value of the interference signal using $R_{rr}$; or perform the channel estimation using the interference measurement reference signal to acquire the channel estimation value H, determine a power matrix P of the interference signal using the interference measurement parameter, determine the correlation matrix for the reception of the interference signal as $R_{rr}=HPH^H$, and calculate the interference estimation value of the interference signal using $R_{rr}$. When determining the antenna ports for the interference measurement based on the interference measurement parameter, performing the channel estimation on the antenna ports for the interference measurement using the interference measurement reference signal, determining the correlation matrix for the reception of the interference signal based on the channel estimation value and calculating the interference estimation value of the interference signal using the correlation matrix for the reception of the interference signal, the transceiver or the processor is further configured to determine the antenna ports for the interference measurement based on the interference measurement parameter, perform the channel estimation on the antenna ports for the interference measurement using the interference measurement reference signal to acquire the channel estimation value $H_i$, determine the correlation matrix for the reception of the interference signal as $R_{rr}=H_iH_i^H$, and calculate the interference estimation value of the interference signal using $R_{rr}$, where $(\ )^H$ represents conjugate transposition.

In a possible embodiment of the present disclosure, when determining the correlation matrix R for the transmission of the interference measurement reference signal using the interference measurement parameter, the transceiver or the processor is further configured to: when the interference measurement parameter is the indication information about one matrix in the at least two $N_p*N_p$ matrices, determine the matrix indicated by the interference measurement parameter as the correlation matrix R for the transmission of the interference signal; when the interference measurement parameter is the indication information about at least two matrices in the at least two $N_p*N_p$ matrices, determine a sum of the at least two matrices indicated by the interference measurement parameter as the correlation matrix R for the transmission of the interference signal; when the interference measurement parameter is the indication information about n antenna ports in the $N_p$ antenna ports, construct a diagonal matrix having a dimension of $N_p$ as the correlation matrix R for the transmission of the interference signal, each of elements on each diagonal line of the diagonal matrix and corresponding to the antenna ports indicated by the interference measurement parameter having a non-zero value, and the other elements each having a value of zero; or when the interference measurement parameter is the correlation matrix for the transmission of the interference signal, determine the correlation matrix as the correlation matrix R for the transmission of the interference signal; or when the interference measurement parameter is the indication information about k vectors in $N_p$ vectors having a dimension of $N_p*1$, determine the correlation matrix for the transmission of the interference signal as $R=v_1v_1^H+v_2v_2^H+\ldots+v_kv_k^H$, where $v_i$ represents an ith codeword indicated by the interference measurement parameter, and i=1, 2, 3, . . . , k; or when the interference measurement parameter is the indication information about one matrix in Q matrices, determine the correlation matrix R for the transmission of the interference signal as $R=VV^H$, where V represents the matrix indicated by the interference measurement parameter; or when the interference measurement parameter is the indication information about m matrices in Q matrices, determine the correlation matrix R for the transmission of the interference signal as $R=V_1V_1^H+\ldots+V_mV_m^H$, where $V_i$ represents an ith matrix indicated by the interference measurement parameter, i=1, . . . , m, and m is an integer greater than or equal to 2.

In a possible embodiment of the present disclosure, when determining the antenna ports for the interference measurement based on the interference measurement parameter, the transceiver or the processor is further configured to: when the interference measurement parameter is the indication information about at least one matrix in at least two $N_p*N_p$ matrices, determine antenna ports corresponding to elements each having a non-zero value on each diagonal line of the matrix indicated by the interference measurement parameter as the antenna ports for the interference measurement; or when the interference measurement parameter is the indication information about n antenna ports in $N_p$ antenna ports, determine the n antenna ports indicated by the interference measurement parameter as the antenna ports for the interference measurement; or when the interference measurement parameter is the correlation matrix for the transmission of the interference measurement reference signal, determine antenna ports corresponding to elements each having a non-zero value on each diagonal line of the correlation matrix indicated by the interference measurement parameter as the antenna ports for the interference measurement; or when the interference measurement parameter is the indication information about k vectors in $N_p$ vectors having a dimension of $N_p*1$, determine antenna ports corresponding to elements each having a non-zero value in the k vectors as the antenna ports for the interference measurement; or when the interference measurement parameter is the indication information about at least one matrix in Q matrices, determine antenna ports corresponding to elements each having a non-zero value in the matrix indicated by the interference measurement parameter as the antenna ports for the interference measurement.

In a possible embodiment of the present disclosure, the transceiver is further configured to calculate CSI based on the interference estimation value and transmit the CSI to the network side device; or the processor is further configured to calculate the CSI based on the interference estimation value, and the transceiver is further configured to transmit the CSI to the network side device.

In still yet another aspect, the present disclosure provides in some embodiments a network side device, including a transceiver, a memory, a processor, and a computer program stored in the memory and executed by the processor. The processor is configured to read a program stored in the memory, so as to generate configuration information about an interference measurement reference signal resource and an interference measurement parameter. The transceiver is configured to transmit the configuration information and the interference measurement parameter to a UE, so that the UE calculates an interference estimation value of an interference signal based on the interference measurement parameter and an interference measurement reference signal.

In a possible embodiment of the present disclosure, the interference measurement parameter is used to indicate a spatial feature and/or a strength feature of the interference signal.

In a possible embodiment of the present disclosure, the strength feature includes power information or amplitude information about the interference signal corresponding to at least one antenna port for the interference measurement reference signal.

In a possible embodiment of the present disclosure, the power information is a ratio of power of the interference signal to power of the interference measurement reference signal, and the amplitude information is a ratio of an amplitude of the interference signal to an amplitude of the interference measurement reference signal.

In a possible embodiment of the present disclosure, the spatial feature of the interference signal includes a correlation matrix or a precoding matrix for the transmission of the interference signal.

In a possible embodiment of the present disclosure, the correlation matrix is a diagonal matrix, and each element on each diagonal line has a non-zero value or has a value of zero. Merely one element in each column of the precoding matrix has a non-zero value, and the other elements in the column each have a value of zero.

In a possible embodiment of the present disclosure, the non-zero value is a constant, or the non-zero value is a value determined by the UE based on signaling from the network side device. The non-zero value in the correlation matrix is the same as or different from the non-zero value in the precoding matrix.

In a possible embodiment of the present disclosure, the interference measurement parameter is indication information about at least one matrix in at least two $N_p*N_p$ matrices; or the interference measurement parameter is indication information about n antenna ports in $N_p$ antenna ports, where $0<n \leq N_p$; or the interference measurement parameter is the correlation matrix for the transmission of the interference signal; or the interference measurement parameter is indication information about k vectors in $N_p$ vectors having a dimension of $N_p*1$, merely one element in each vector having a non-zero value, the other elements in the vector each having a value of zero, where k is an integer greater than or equal to 1; or the interference measurement parameter is indication information about at least one matrix in Q matrices, the Q matrices including matrices having dimensions of $N_p*1, N_p*2, N_p*3, \ldots, N_p*Q$ respectively, $Q \leq N_p$, merely one element in each column of each matrix having a non-zero value and the other elements in the column of the matrix having a value of zero, or merely one element in each column of each matrix having a non-zero value, the other elements in the column of the matrix having a value of zero, and merely one element in each row of each matrix having a non-zero value, and the other elements in the row of the matrix having a value of zero, where Np represents the quantity of transmission antenna ports for the interference measurement reference signal.

In a possible embodiment of the present disclosure, the transceiver is further configured to receive CSI from the UE, the CSI being calculated by the UE based on the interference estimation value.

In still yet another aspect, the present disclosure provides in some embodiments a computer-readable storage medium storing therein a computer program. The computer program is executed by a processor so as to implement the above-mentioned interference measurement method for the UE.

In still yet another aspect, the present disclosure provides in some embodiments a computer-readable storage medium storing therein a computer program. The computer program is executed by a processor so as to implement the above-mentioned interference measurement method for the network side device.

In still yet another aspect, the present disclosure provides in some embodiments a UE, including a transceiver, a memory, a processor, and a computer program stored in the memory and executed by the processor. The computer program is executed by the processor so as to implement the above-mentioned interference measurement method.

In still yet another aspect, the present disclosure provides in some embodiments a network side device, including a transceiver, a memory, a processor, and a computer program stored in the memory and executed by the processor. The computer program is executed by the processor so as to implement the above-mentioned interference measurement method.

According to the embodiments of the present disclosure, the UE may receive the configuration information about the interference reference signal resource and the interference measurement parameter from the network side device, receive the interference measurement reference signal on the interference measurement reference signal resource based on the configuration information, and calculate the interference estimation value of the interference signal based on the interference measurement parameter and the interference measurement reference signal. As a result, it is able for the UE to perform the interference measurement with the aid of the interference measurement parameter, thereby to improve the interference measurement accuracy.

DETAILED DESCRIPTION

In order to make the objects, the technical solutions and the advantages of the present disclosure more apparent, the present disclosure will be described hereinafter in a clear and complete manner in conjunction with the drawings and embodiments.

Figure 1:
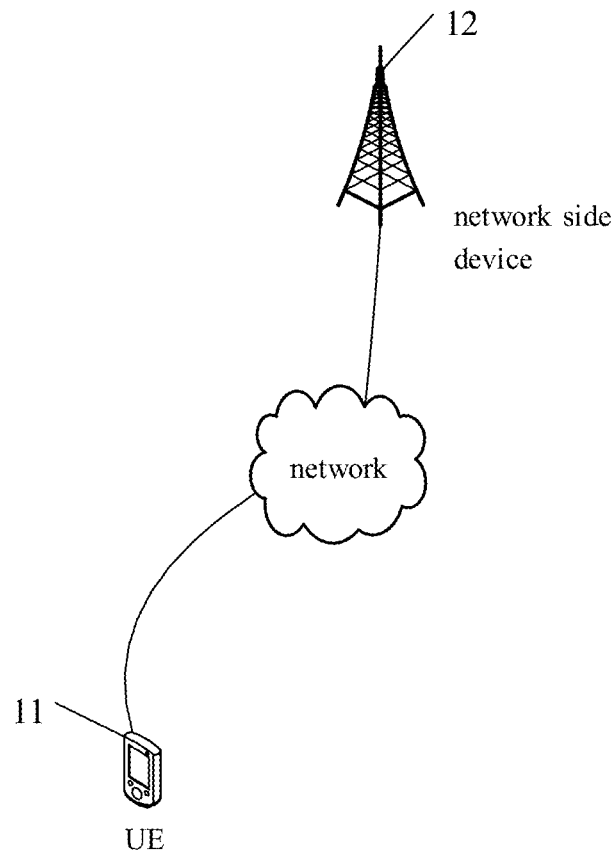
FIG. 1 is a schematic view showing an available network according to one embodiment of the present disclosure.

As shown in FIG. 1, an available network includes a UE 11 and a network side device 12. The UE 11 may be a mobile phone, a tablet personal computer, a laptop computer, a Personal Digital Assistant (PDA), a Mobile Internet Device (MID) or a wearable device. It should be appreciated that, the types of the UE 11 will not be particularly defined herein. The network side device 12 may be a base station, e.g., a macro base station, a micro base station (e.g., Long Term Evolution (LTE) evolved Node B (eNB), or $5^{th}$-Generation (5G) New Radio (NR) NB), or a micro base station (e.g., a Low Power Node (LPN) pico base station, or a femto base station), or an Access Point (AP). In addition, the base station may also be a network node consisting of a Central Unit (CU) and a plurality of Transmission Reception Points (TRPs) managed and controlled by the CU. It should be appreciated that, the types of the network side device 12 will not be particularly defined herein.

Figure 2:
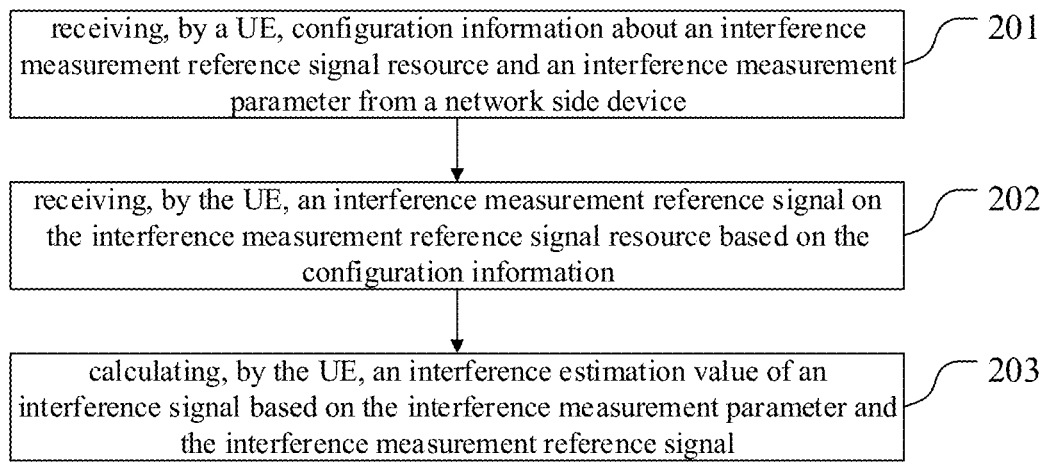
FIG. 2 is a flow chart of an interference measurement method according to one embodiment of the present disclosure.

The present disclosure provides in some embodiments an interference measurement method which, as shown in FIG. 2, includes: Step 201 of receiving, by a UE, configuration information about an interference measurement reference signal resource and an interference measurement parameter from a network side device; Step 202 of receiving, by the UE, an interference measurement reference signal on the interference measurement reference signal resource based on the configuration information; and Step 203 of calculating, by the UE, an interference estimation value of an interference signal based on the interference measurement parameter and the interference measurement reference signal.

The configuration information and the interference measurement parameter may be received through a same message or different messages, which will not be particularly defined herein. In addition, the configuration information may further include one or more of: a sequence of a reference signal for each antenna port; one or more Identities (IDs) for calculating the sequence of the reference signal for each antenna port; indication information indicating whether there is an interference on each antenna port; indication information for aiding the UE to select, combine or perform an averaging operation or indication information for further processing a signal on one or more antenna ports; indication information about a characteristic of the signal on each antenna port (e.g., whether the signal is an active signal or an interference signal); and configuration information about physical resource block (PRB) aggregation for each antenna port (when the PRB aggregation has been configured, the UE may perform interference estimation using aggregated PRBs in one PRB subset in a joint manner, i.e., the UE may assume that a same precoding mode is adopted by the signals on the aggregated PRBs).

The interference measurement reference signal resource may include a time-frequency resource needed by the interference measurement reference signal for $N_p$ antenna ports. In addition, the interference measurement reference signal may be a non-zero power Channel State Information Reference Signal (NZP CSI-RS). Of course, the interference measurement reference signal may also be a reference signal for any other uses, which will not be particularly defined herein. Furthermore, the interference measurement reference signal resource may be determined by the network side device itself, or determined by a plurality of network side devices through negotiation, which will not be particularly defined herein. The interference measurement reference signal resource may include one or more interference measurement reference signal resources.

The interference measurement parameter may be used to indicate a measurement mode for the UE to perform the interference measurement on the interference measurement reference signal resource, e.g., for indicating the UE how to perform the interference measurement based on the interference measurement reference signal resource. In addition, the interference measurement reference signal resource may be determined by the network side device itself, or determined by a plurality of network side devices through negotiation, which will not be particularly defined herein.

In addition, Step 203 of calculating the interference estimation value of the interference signal based on the interference measurement parameter and the interference measurement reference signal may include: determining a correlation matrix for the interference signal based on the interference measurement parameter and the interference measurement reference signal, and calculating the interference estimation value of the interference signal using the correlation matrix for the interference signal; or determining a relevant parameter of the interference signal based on the interference measurement parameter, and calculating the interference estimation value of the interference signal using the relevant parameter and the interference measurement reference signal, which will not be particularly defined herein.

It should be appreciated that, in the embodiments of the present disclosure, the interference measurement reference signal may be a signal received by the UE on the interference measurement reference signal resource, and the interference signal may be a signal simulated or assumed by the UE, e.g., an interference signal simulated or assumed by the UE for data transmission. Through calculating the interference estimation value of the interference signal, it is able to accurately predict an interference situation when the data transmission is performed by the UE, thereby to improve the transmission performance of the UE.

Through the above steps, the UE may perform the interference measurement with the aid of the interference measurement parameter, so as to improve the interference measurement accuracy, thereby to improve the feedback accuracy of CSI. In addition, the interference measurement parameter is configured by the network side device for the UE, and various characteristics of a service from an interference source, e.g., a service duration, is capable of being acquired by the network side device, so the network side device may configure the corresponding interference measurement parameter for the UE. In this regard, the interference estimation value calculated by the UE based on the interference measurement parameter may match an actual interference occurring during the data transmission. In addition, the network side device may acquire a dynamic change of a multi-user Multiple-Input Multiple-Output (MIMO) scheduling operation, so for the multi-user MIMO transmission, it is able for the UE to measure the interference occurring between users in a same cell and sharing a same resource, so as to improve the interference measurement performance.

In a possible embodiment of the present disclosure, the interference measurement parameter may be used to indicate a spatial feature and/or a strength feature of the interference signal.

The spatial feature may be understood as a spatial feature of the interference signal subjected to the UE during the actual data transmission. The strength feature may be signal intensity or transmission power, and it may be understood as a strength feature of the interference signal subjected to the UE during the actual data transmission.

In some embodiments of the present disclosure, because the UE has acquired the spatial feature and/or the strength feature of the interference signal, it is able for the UE to calculate the interference estimation value of the interference signal in a more accurate manner.

In a possible embodiment of the present disclosure, the strength feature may include power information or amplitude information about the interference signal corresponding to at least one antenna port for the interference measurement reference signal. To be specific, the strength feature may include the power information or the amplitude information about the interference signal corresponding to at least one antenna port for the interference measurement reference signal. Further, the power information may be a ratio of power of the interference signal to power of the interference measurement reference signal, and the amplitude information may be a ratio of an amplitude of the reference signal to an amplitude of the reference measurement reference signal.

When the strength feature is the ratio of the power of the interference signal to the power of the interference measurement reference signal (the same method may be applied to the situation where the strength feature is the ratio of the amplitude of the interference signal to the amplitude of the interference measurement reference signal), a value of the ratio may selected from a set, e.g., {0, ⅛, ¼, ½, 1, 2, 4, 8}, {0, ¼, ½, 1, 2, 4}, {0, ¼}, {0, ½}, or {0, 1}. The set may be configured by the network side device for the UE through high-layer signaling, or pre-agreed by the network side device and the UE, e.g., defined in a protocol.

In some embodiments of the present disclosure, because the UE has acquired the strength feature of the interference signal, it is able for the UE to calculate the interference estimation value of the interference signal in a more accurate manner. The interference measurement parameter may be $\{q_1, q_2, \ldots, q_{N_p}\}$, where $q_n$ represents a ratio of transmission power of the interference signal corresponding to an $n^{th}$ antenna port for the interference measurement reference signal and transmission power of reference signal corresponding to the $n^{th}$ antenna port.

In a possible embodiment of the present disclosure, the spatial feature of the interference signal may include a correlation matrix or a precoding matrix for the transmission of the interference signal.

In some embodiments of the present disclosure, because the UE has acquired the correlation matrix or the precoding matrix for the transmission of the interference signal, it is able for the UE to calculate the interference estimation value of the interference signal in a more accurate manner.

In a possible embodiment of the present disclosure, the correlation matrix may be a diagonal matrix, and each element on each diagonal line may have a non-zero value or has a value of zero. Merely one element in each column of the precoding matrix may have a non-zero value, and the other elements in the column may each have a value of zero. Further, merely one element in each row of the precoding matrix may have a non-zero value, and the other elements in the row may each have a value of zero.

The non-zero value may be a constant, or determined by the UE based on signaling from the network side device. The non-zero value in the correlation matrix may be the same as or different from the non-zero value in the precoding matrix, e.g., 1 or any other values.

It should be appreciated that, when the elements on the diagonal line each have a non-zero value or a value of zero. It does not mean that all elements on the diagonal lines have to be a non-zero value or a value of zero. Instead, it may be understood as that each element on the diagonal line may have the non-zero value or a value of zero, e.g., $$\begin{bmatrix} 1 & & & \\ & 1 & & \\ & & 0 & \\ & & & 0 \end{bmatrix}, \begin{bmatrix} 1 & & & \\ & 0 & & \\ & & 0 & \\ & & & 0 \end{bmatrix}, \begin{bmatrix} 1 & & & \\ & 1 & & \\ & & 1 & \\ & & & 0 \end{bmatrix},$$

$$\begin{bmatrix} 1 & & & \\ & 1 & & \\ & & 1 & \\ & & & 1 \end{bmatrix}, \text{or} \begin{bmatrix} 1 & & \\ & 0 & \\ & & 1 \\ & & & 1 \end{bmatrix}.$$

In some embodiments of the present disclosure, it is able to determine the spatial feature of the interference signal accurately based on the correlation matrix or the precoding matrix, thereby to improve the interference measurement accuracy.

When the spatial feature of the interference signal includes the correlation matrix or the precoding matrix for the transmission of the interference signal, the interference measurement parameter may indicate the correlation matrix or the precoding matrix for the transmission of the interference signal in one of the following modes.

In Mode 1, the interference measurement parameter may be indication information about at least one matrix in at least two $N_p*N_p$ matrices.

In Mode 2, the interference measurement parameter may be indication information about n antenna ports in $N_p$ antenna ports, where $0<n \leq N_p$.

In Mode 3, the interference measurement parameter may be the correlation matrix for the transmission of the interference signal.

In Mode 4, the interference measurement parameter may be indication information about k vectors in $N_p$ vectors having a dimension of $N_p*1$, merely one element in each vector has a non-zero value, the other elements in each vector each have a value of zero, where k is an integer greater than or equal to 1.

In Mode 5, the interference measurement parameter may be indication information about at least one matrix in Q matrices, the Q matrices including matrices have dimensions of $N_p*1, N_p*2, N_p*3, \ldots, N_p*Q$ respectively, $Q \leq N_p$, merely one element in each column of each matrix has a non-zero value and the other elements in the column of the matrix each have a value of zero, or merely one element in each column of each matrix has a non-zero value, the other elements in the column of the matrix each have a value of zero, and merely one element in each row of each matrix has a non-zero value, and the other elements in the row of the matrix each have a value of zero, where $N_p$ represents the quantity of transmission antenna ports for the interference measurement reference signal.

It should be appreciated that, in the embodiments of the present disclosure, a plurality of matrices may also be called as a codebook, i.e., one codebook may include a plurality of matrices, and each matrix may be called as a codeword. Of course, in some embodiments of the present disclosure, when merely vectors are provided, one vector may also be called as a codeword.

Mode 1 may be understood as a mode where the interference measurement parameter is configured using a predefined codebook, specifically a port selection codebook. For example, the predefined codebook may include K matrices (codewords) having a dimension of $N_p*N_p$. Each matrix may be a diagonal matrix, and each element on the diagonal line may have a value of 1 (or any other non-zero value) or a value of 0. The codebook may at most include $2^{N_p}-1$ codewords. Followings as some examples of the codewords in the codebook when $$\begin{bmatrix} 1 & & & \\ & 1 & & \\ & & 0 & \\ & & & 0 \end{bmatrix}, \begin{bmatrix} 1 & & & \\ & 0 & & \\ & & 0 & \\ & & & 0 \end{bmatrix}, \begin{bmatrix} 1 & & & \\ & 1 & & \\ & & 1 & \\ & & & 0 \end{bmatrix},$$

$$\begin{bmatrix} 1 & & & \\ & 1 & & \\ & & 1 & \\ & & & 1 \end{bmatrix}, \text{ and } \begin{bmatrix} 1 & & & \\ & 0 & & \\ & & 1 & \\ & & & 1 \end{bmatrix}.$$

In Mode 1, it is able to accurately indicate the correlation matrix for the transmission of the interference signal to the UE, thereby to improve the interference measurement accuracy.

Mode 2 may be understood as a mode where the interference measurement parameter is configured through port indication. In some embodiments of the present disclosure, the interference measurement parameter may be indicated through a bitmap, e.g., a bitmap having a length of $N_p$ with each bit corresponding to one antenna port, where the value "1" represents the corresponding antenna port is selected. Of course, the interference measurement parameter may also be indicated through serial numbers of the antenna ports, and a serial number of each of the n antenna ports may be transmitted to the UE. When the interference measurement parameter indicates the n antenna ports, it may be understood as that the interference measurement parameter has indicated the correlation matrix or the precoding matrix for the transmission of the interference signal, because the UE may acquire the correlation matrix or the precoding matrix for the transmission of the interference signal through the n antenna ports.

In Mode 2, it is able to indicate the antenna ports for the interference signal accurately to the UE, thereby to further improve the interference measurement accuracy.

In Mode 3, the interference measurement parameter may be the correlation matrix for the transmission of the interference signal, and the correlation matrix may be an $N_p*N_p$ diagonal matrix, with each element on the diagonal line having a value of 1 (or any other non-zero values) or 0. Followings are some possible examples of the correlation matrices for the transmission of the interference signal when $$\begin{bmatrix} 1 & & & \\ & 1 & & \\ & & 0 & \\ & & & 0 \end{bmatrix}, \begin{bmatrix} 1 & & & \\ & 0 & & \\ & & 0 & \\ & & & 0 \end{bmatrix}, \begin{bmatrix} 1 & & & \\ & 1 & & \\ & & 1 & \\ & & & 0 \end{bmatrix},$$

$$\begin{bmatrix} 1 & & & \\ & 1 & & \\ & & 1 & \\ & & & 1 \end{bmatrix}, \text{ and } \begin{bmatrix} 1 & & & \\ & 0 & & \\ & & 1 & \\ & & & 1 \end{bmatrix}.$$

In Mode 3, because the interference measurement parameter is the correlation matrix for the transmission of the interference signal, it is able to improve the interference measurement efficiency of the UE, and ensure the interference measurement accuracy.

Mode 4 may be understood as a mode where the interference measurement parameter is configured using a predefined codebook, specifically a port selection codebook including $N_p$ vectors (codewords) having a dimension of $N_p*1$ or at most $N_p$ codewords. Merely one element in each vector has a value of 1 (or any other non-zero value), and the other elements each have a value of 0.

In Mode 4, the interference measurement parameter may be used to accurately indicate the correlation matrix or the precoding matrix for the transmission of the interference signal, so as to improve the interference measurement accuracy.

Mode 5 may also be understood as a mode where the interference measurement parameter is configured using a predefined codebook, specifically a port selection codebook. For example, the codebook may include matrices (codewords) having dimensions of $N_p*1, N_p*2, N_p*3, \ldots, N_p*Q$ respectively, and $Q \leq N_p$. Merely one element in each column of each codeword has a value of 1 (or any other non-zero value) and the other elements in the column each have a value of 0. Further, merely one element in each column of each codeword has a value of 1 (or any other non-zero value), the other elements each have a value of 0. Followings are some examples of the codewords in the codebook when $N_p=4$. When Q=1 (i.e., a dimension of $N_p*1$), $$\begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix} \text{ and } \begin{bmatrix} 0 \\ 0 \\ 0 \\ 1 \end{bmatrix};$$

when Q=2 (i.e., a dimension of $N_p*2$), $$\begin{bmatrix} 1 & 0 \\ 0 & 1 \\ 0 & 0 \\ 0 & 0 \end{bmatrix}, \begin{bmatrix} 1 & 0 \\ 0 & 0 \\ 0 & 1 \\ 0 & 0 \end{bmatrix}, \begin{bmatrix} 1 & 0 \\ 0 & 0 \\ 0 & 0 \\ 0 & 1 \end{bmatrix},$$

$$\begin{bmatrix} 0 & 0 \\ 1 & 0 \\ 0 & 1 \\ 0 & 0 \end{bmatrix}, \begin{bmatrix} 0 & 0 \\ 1 & 0 \\ 0 & 0 \\ 0 & 1 \end{bmatrix}, \text{ and } \begin{bmatrix} 0 & 0 \\ 0 & 0 \\ 1 & 0 \\ 0 & 1 \end{bmatrix};$$

and when Q=3 (i.e., a dimension of $N_p*3$), $$\begin{bmatrix} 1 & 0 & 0 \\ 0 & 1 & 0 \\ 0 & 0 & 1 \\ 0 & 0 & 0 \end{bmatrix}, \begin{bmatrix} 1 & 0 & 0 \\ 0 & 0 & 0 \\ 0 & 1 & 0 \\ 0 & 0 & 1 \end{bmatrix}, \begin{bmatrix} 0 & 0 & 0 \\ 1 & 0 & 0 \\ 0 & 1 & 0 \\ 0 & 0 & 1 \end{bmatrix}, \text{ and } \begin{bmatrix} 1 & 0 & 0 \\ 0 & 1 & 0 \\ 0 & 0 & 0 \\ 0 & 0 & 1 \end{bmatrix};$$

when Q=4 (i.e., a dimension of $N_p*4$), $$\begin{matrix} 1 & 0 & 0 & 0 \\ 0 & 1 & 0 & 0 \\ 0 & 0 & 1 & 0 \\ 0 & 0 & 0 & 1 \end{matrix}.$$

In Mode 5, the interference measurement parameter may be used to accurately indicate the correlation matrix or the precoding matrix for the transmission of the interference signal, so as to improve the interference measurement accuracy.

In the embodiments of the present disclosure, the interference measurement parameter may be flexibly configured for the UE in various modes, so as to improve the system flexibility while ensuring the accuracy of the interference measurement, thereby to meet the requirements on different services or scenarios.

In a possible embodiment of the present disclosure, the calculating, by the UE, the interference estimation value of the interference signal based on the interference measurement parameter and the interference measurement reference signal may include determining, by the UE, a correlation matrix for the reception of the interference signal based on the interference measurement parameter and the interference measurement reference signal, and calculating the interference estimation value of the interference signal using the correlation matrix for the reception of the interference signal.

The determining the correlation matrix for the reception of the interference signal may include determining the correlation matrix for the reception of the interference signal based on a channel estimation value acquired after performing channel estimation using the interference measurement reference signal and the indication information indicated by the interference measurement parameter. The calculating the interference estimation value of the interference signal using the correlation matrix for the reception of the interference signal may include calculating the interference estimation value of the interference signal using elements on a diagonal line of the correlation matrix, or using all elements of the correlation matrix, which will not be particularly defined herein.

In some embodiments of the present disclosure, the interference estimation value of the interference signal may be calculated using the correlation matrix for the reception of the interference signal, so as to further improve the interference measurement accuracy.

In a possible embodiment of the present disclosure, the determining, by the UE, the correlation matrix for the reception of the interference signal based on the interference measurement parameter and the interference measurement reference signal and calculating the interference estimation value of the interference signal using the correlation matrix for the reception of the interference signal may include determining, by the UE, the correlation matrix for the reception of the interference signal on each subcarrier or RE within a measurement bandwidth based on the interference measurement parameter and the interference measurement reference signal, performing an averaging operation on the correlation matrices for the reception of the interference signal on all the subcarriers or REs within the measurement bandwidth, and calculating the interference estimation value of the interference signal based on a result of the averaging operation.

In the embodiments of the present disclosure, it is able to perform the averaging operation on the correlation matrices on the subcarriers or REs within the measurement bandwidth, so as to acquire a more stable interference estimation value.

In a possible embodiment of the present disclosure, the determining, by the UE, the correlation matrix for the reception of the interference signal based on the interference measurement parameter and the interference measurement reference signal and calculating the interference estimation value of the interference signal using the correlation matrix for the reception of the interference signal may include: performing, by the UE, channel estimation using the interference measurement reference signal, determining the correlation matrix for the reception of the interference signal based on a channel estimation value and the interference measurement parameter, and calculating the interference estimation value of the interference signal using the correlated matrix for the reception of the interference signal; or determining, by the UE, antenna ports for the interference measurement based on the interference measurement parameter, performing channel estimation on the antenna ports for the interference measurement using the interference measurement reference signal, determining the correlation matrix for the reception of the interference signal based on a channel estimation value, and calculating the interference estimation value of the interference signal using the correlation matrix for the reception of the interference signal.

Through the above-mentioned two modes, it is able to accurately calculate the interference estimation value of the interference signal.

It should be appreciated that, in the embodiments of the present disclosure, the determination of the correlation matrix for the reception of the interference signal may not be limited to the above two modes, and the correlation matrix for the reception of the interference signal may also be determined in any other modes, which will not be particularly defined herein.

In a possible embodiment of the present disclosure, the performing, by the UE, the channel estimation using the interference measurement reference signal, determining the correlation matrix for the reception of the interference signal based on the channel estimation value and the interference measurement parameter and calculating the interference estimation value of the interference signal using the correlation matrix for the reception of the interference signal may include: performing, by the UE, the channel estimation using the interference measurement reference signal to acquire the channel estimation value H, determining the correlation matrix R for the transmission of the interference signal using the interference measurement parameter, determining the correlation matrix for the reception of the interference signal as $R_{rr}=HRH^H$, and calculating the interference estimation value of the interference signal using $R_{rr}$; or performing, by the UE, the channel estimation using the interference measurement reference signal to acquire the channel estimation value H, determining a power matrix P of the interference signal using the interference measurement parameter, determining the correlation matrix for the reception of the interference signal as $R_{rr}=HPH^H$, and calculating the interference estimation value of the interference signal using $R_{rr}$.

For example, the power matrix P of the interference signal may be $$P = \begin{bmatrix} q_1 & 0 & 0 & 0 \\ 0 & q_2 & 0 & 0 \\ 0 & 0 & \ddots & 0 \\ 0 & 0 & 0 & q_{N_p} \end{bmatrix}.$$

Based on the above description about the strength feature, the interference measurement parameter may be $\{q_1, q_2, \ldots, q_{N_p}\}$, where $q_n$ represents a ratio of transmission power of the interference signal corresponding to an $n^{th}$ antenna port for the interference measurement reference signal to transmission power of a reference signal for the $n^{th}$ antenna port. The correlation matrix P may be $$P = \begin{bmatrix} q_1 & 0 & 0 & 0 \\ 0 & q_2 & 0 & 0 \\ 0 & 0 & \ddots & 0 \\ 0 & 0 & 0 & q_{N_p} \end{bmatrix},$$

i.e., $$R_{rr} = H \begin{bmatrix} q_1 & 0 & 0 & 0 \\ 0 & q_2 & 0 & 0 \\ 0 & 0 & \ddots & 0 \\ 0 & 0 & 0 & q_{N_p} \end{bmatrix} H^H.$$

When $q_n=0$, it is equivalent to that the interference caused by the interference signal corresponding to the nth antenna port may not be taken into consideration.

In a possible embodiment of the present disclosure, the determining, by the UE, the antenna ports for the interference measurement based on the interference measurement parameter, performing the channel estimation on the antenna ports for the interference measurement using the interference measurement reference signal, determining the correlation matrix for the reception of the interference signal based on the channel estimation value and calculating the interference estimation value of the interference signal using the correlation matrix for the reception of the interference signal may include determining, by the UE, the antenna ports for the interference measurement based on the interference measurement parameter, performing the channel estimation on the antenna ports for the interference measurement using the interference measurement reference signal to acquire the channel estimation value $H_i$, determining the correlation matrix for the reception of the interference signal as $R_{rr}=H_i H_i^H$, and calculating the interference estimation value of the interference signal using $R_{rr}$, where $(\ )^H$ represents conjugate transposition.

H may be an $N_r*N_p$ matrix, and $H_i$ may be an $N_r*n$ matrix. H and $H_i$ may each be the channel estimation value on one subcarrier or RE, i.e., with respect to any subcarrier or RE, the channel estimation value and the correlation matrix for the reception of the interference signal may be acquired as mentioned hereinabove.

In a possible embodiment of the present disclosure, the determining the correlation matrix R for the transmission of the interference measurement reference signal using the interference measurement parameter may include: when the interference measurement parameter is the indication information about one matrix in the at least two $N_p*N_p$ matrices, determining the matrix indicated by the interference measurement parameter as the correlation matrix R for the transmission of the interference signal; when the interference measurement parameter is the indication information about at least two matrices in the at least two $N_p*N_p$ matrices, determining a sum of the at least two matrices indicated by the interference measurement parameter as the correlation matrix R for the transmission of the interference signal; when the interference measurement parameter is the indication information about n antenna ports in the $N_p$ antenna ports, constructing a diagonal matrix having a dimension of $N_p$ as the correlation matrix R for the transmission of the interference signal, each of elements on each diagonal line of the diagonal matrix and corresponding to the antenna ports indicated by the interference measurement parameter having a non-zero value, and the other elements each having a value of zero; or when the interference measurement parameter is the correlation matrix for the transmission of the interference signal, determining the correlation matrix as the correlation matrix R for the transmission of the interference signal; or when the interference measurement parameter is the indication information about k vectors in $N_p$ vectors having a dimension of $N_p*1$, determining the correlation matrix for the transmission of the interference signal as $R=v_1 v_1^H + v_2 v_2^H + \ldots + v_k v_k^H$, where $v_i$ represents an ith codeword indicated by the interference measurement parameter, and i=1, 2, 3, . . . , k; or when the interference measurement parameter is the indication information about one matrix in Q matrices, determining the correlation matrix R for the transmission of the interference signal as $R=VV^H$, where V represents the matrix indicated by the interference measurement parameter; or when the interference measurement parameter is the indication information about m matrices in Q matrices, determining the correlation matrix R for the transmission of the interference signal as $R=V_1 V_1^H + \ldots + V_m V_m^H$, where $V_i$ represents an ith matrix indicated by the interference measurement parameter, i=1, . . . , m, and m is an integer greater than or equal to 2.

In the embodiments of the present disclosure, it is able to flexibly determine the correlation matrix for the transmission of the interference signal in different situations, thereby to improve the interference measurement flexibility. It should be appreciated that, in some embodiments of the present disclosure, the interference measurement parameter may refer to the five modes mentioned hereinabove, and thus will not be particularly defined herein.

In a possible embodiment of the present disclosure, the determining, by the UE, the antenna ports for the interference measurement based on the interference measurement parameter may include: when the interference measurement parameter is the indication information about at least one matrix in at least two $N_p*N_p$ matrices, determining antenna ports corresponding to elements each having a non-zero value on each diagonal line of the matrix indicated by the interference measurement parameter as the antenna ports for the interference measurement; or when the interference measurement parameter is the indication information about n antenna ports in $N_p$ antenna ports, determining the n antenna ports indicated by the interference measurement parameter as the antenna ports for the interference measurement; or when the interference measurement parameter is the correlation matrix for the transmission of the interference measurement reference signal, determining antenna ports corresponding to elements each having a non-zero value on each diagonal line of the correlation matrix indicated by the interference measurement parameter as the antenna ports for the interference measurement; or when the interference measurement parameter is the indication information about k vectors in $N_p$ vectors having a dimension of $N_p*1$, determining antenna ports corresponding to elements each having a non-zero value in the k vectors as the antenna ports for the interference measurement; or when the interference measurement parameter is the indication information about at least one matrix in Q matrices, determining antenna ports corresponding to elements each having a non-zero value in the matrix indicated by the interference measurement parameter as the antenna ports for the interference measurement.

In the embodiments of the present disclosure, it is able to flexibly determine the antenna ports for the interference measurement in different situations, thereby to improve the interference measurement flexibility. It should be appreciated that, in some embodiments of the present disclosure, the interference measurement parameter may refer to the five modes mentioned hereinabove, and thus will not be particularly defined herein.

In a possible embodiment of the present disclosure, the interference measurement method may further include calculating CSI based on the interference estimation value, and transmitting the CSI to the network side device. In this way, it is able to improve the feedback accuracy of the CSI.

It should be appreciated that, the above-mentioned possible embodiments may be combined in any form or implemented separately, which will not be particularly defined herein.

According to the embodiments of the present disclosure, the UE may receive the configuration information about the interference reference signal resource and the interference measurement parameter from the network side device, receive the interference measurement reference signal on the interference measurement reference signal resource based on the configuration information, and calculate the interference estimation value of the interference signal based on the interference measurement parameter and the interference measurement reference signal. As a result, it is able for the UE to perform the interference measurement with the aid of the interference measurement parameter, thereby to improve the interference measurement accuracy.

Figure 3:
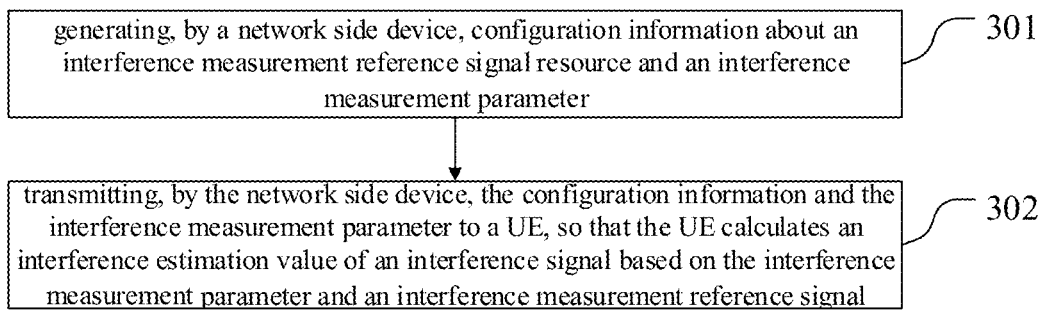
FIG. 3 is a flow chart of an interference measurement method according to one embodiment of the present disclosure.

The present disclosure further provides in some embodiments an interference measurement method which, as shown in FIG. 3, includes: Step 301 of generating, by a network side device, configuration information about an interference measurement reference signal resource and an interference measurement parameter; and Step 302 of transmitting, by the network side device, the configuration information and the interference measurement parameter to a UE, so that the UE calculates an interference estimation value of an interference signal based on the interference measurement parameter and an interference measurement reference signal.

In a possible embodiment of the present disclosure, the interference measurement parameter may be used to indicate a spatial feature and/or a strength feature of the interference signal.

In a possible embodiment of the present disclosure, the strength feature may include power information or amplitude information about the interference signal corresponding to at least one antenna port for the interference measurement reference signal.

In a possible embodiment of the present disclosure, the power information may be a ratio of power of the interference signal to power of the interference measurement reference signal, and the amplitude information may be a ratio of an amplitude of the interference signal to an amplitude of the interference measurement reference signal.

In a possible embodiment of the present disclosure, the spatial feature of the interference signal may include a correlation matrix or a precoding matrix for the transmission of the interference signal.

In a possible embodiment of the present disclosure, the correlation matrix may be a diagonal matrix, and each element on each diagonal line may have a non-zero value or have a value of zero. Merely one element in each column of the precoding matrix may include a non-zero value, and the other elements in the column may each have a value of zero.

In a possible embodiment of the present disclosure, the non-zero value may be a constant, or the non-zero value may be a value determined by the UE based on signaling from the network side device. The non-zero value in the correlation matrix may be the same as or different from the non-zero value in the precoding matrix.

In a possible embodiment of the present disclosure, the interference measurement parameter may be indication information about at least one matrix in at least two $N_p*N_p$ matrices; or the interference measurement parameter may be indication information about n antenna ports in $N_p$ antenna ports, where $0<n\le N_p$; or the interference measurement parameter may be the correlation matrix for the transmission of the interference signal; or the interference measurement parameter may be indication information about k vectors in $N_p$ vectors having a dimension of $N_p*1$, merely one element in each vector may have a non-zero value, the other elements in the vector may each have a value of zero, where k is an integer greater than or equal to 1; or the interference measurement parameter may be indication information about at least one matrix in Q matrices, the Q matrices may include matrices having dimensions of $N_p*1$, $N_p*2$, $N_p*3$, ..., $N_p*Q$ respectively, $Q\le N_p$, merely one element in each column of each matrix may have a non-zero value and the other elements in the column of the matrix may have a value of zero, or merely one element in each column of each matrix may have a non-zero value, the other elements in the column of the matrix may have a value of zero, and merely one element in each row of each matrix may have a non-zero value, and the other elements in the row of the matrix may each have a value of zero, where Np represents the quantity of transmission antenna ports for the interference measurement reference signal.

In a possible embodiment of the present disclosure, the interference measurement method may further include receiving, by the network side device, CSI from the UE, the CSI being calculated by the UE based on the interference estimation value.

It should be appreciated that, the implementation of the interference measurement method for the network side device in the embodiments may refer to the relevant description in the embodiments as shown in FIG. 2 with a same technical effect, and thus will not be particularly defined herein.

Figure 4:
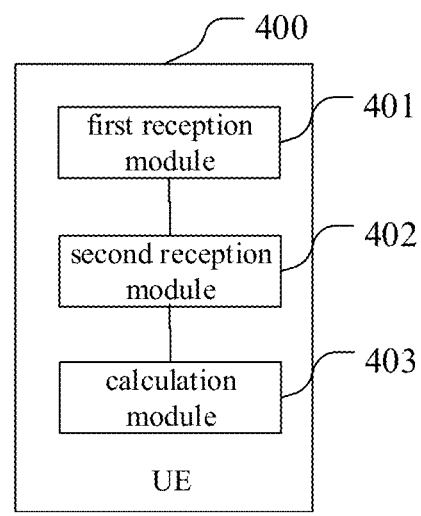
FIG. 4 is a schematic view showing a UE according to one embodiment of the present disclosure.

The present disclosure further provides in some embodiments a UE 400 which, as shown in FIG. 4, includes: a first reception module 401 configured to receive configuration information about an interference measurement reference signal resource and an interference measurement parameter from a network side device; a second reception module 402 configured to receive an interference measurement reference signal on the interference measurement reference signal resource based on the configuration information; and a calculation module 403 configured to calculate an interference estimation value of an interference signal based on the interference measurement parameter and the interference measurement reference signal.

In a possible embodiment of the present disclosure, the strength feature may include power information or amplitude information about the interference signal corresponding to at least one antenna port for the interference measurement reference signal.

In a possible embodiment of the present disclosure, the power information may be a ratio of power of the interference signal to power of the interference measurement reference signal, and the amplitude information may be a ratio of an amplitude of the interference signal to an amplitude of the interference measurement reference signal.

In a possible embodiment of the present disclosure, the interference measurement parameter may be used to indicate a spatial feature and/or a strength feature of the interference signal.

In a possible embodiment of the present disclosure, the spatial feature of the interference signal may include a correlation matrix or a precoding matrix for the transmission of the interference signal.

In a possible embodiment of the present disclosure, the correlation matrix may be a diagonal matrix, and each element on each diagonal line may have a non-zero value or have a value of zero. Merely one element in each column of the precoding matrix may have a non-zero value, and the other elements in the column may each have a value of zero.

In a possible embodiment of the present disclosure, the non-zero value may be a constant, or the non-zero value may be a value determined by the UE based on signaling from the network side device. The non-zero value in the correlation matrix may be the same as or different from the non-zero value in the precoding matrix.

In a possible embodiment of the present disclosure, the interference measurement parameter may be indication information about at least one matrix in at least two $N_p*N_p$ matrices; or the interference measurement parameter may be indication information about n antenna ports in $N_p$ antenna ports, where $0<n\leq N_p$; or the interference measurement parameter may be the correlation matrix for the transmission of the interference signal; or the interference measurement parameter may be indication information about k vectors in $N_p$ vectors having a dimension of $N_p*1$, merely one element in each vector may have a non-zero value, the other elements in the vector may each have a value of zero, where k is an integer greater than or equal to 1; or the interference measurement parameter may be indication information about at least one matrix in Q matrices, the Q matrices may include matrices having dimensions of $N_p*1$, $N_p*2$, $N_p*3$, . . . , $N_p*Q$ respectively, $Q\leq N_p$, merely one element in each column of each matrix may have a non-zero value and the other elements in the column of the matrix may each have a value of zero, or merely one element in each column of each matrix may have a non-zero value, the other elements in the column of the matrix may each have a value of zero, merely one element in each row of each matrix may have a non-zero value, and the other elements in the row of the matrix may each have a value of zero, where Np represents the quantity of transmission antenna ports for the interference measurement reference signal.

In a possible embodiment of the present disclosure, the calculation module 403 is further configured to determine a correlation matrix for the reception of the interference signal based on the interference measurement parameter and the interference measurement reference signal, and calculate the interference estimation value of the interference signal using the correlation matrix for the reception of the interference signal.

In a possible embodiment of the present disclosure, the calculation module 403 is further configured to determine the correlation matrix for the reception of the interference signal on each subcarrier or RE within a measurement bandwidth based on the interference measurement parameter and the interference measurement reference signal, perform an averaging operation on the correlation matrices for the reception of the interference signal on all the subcarriers or REs within the measurement bandwidth, and calculate the interference estimation value of the interference signal based on a result of the averaging operation.

In a possible embodiment of the present disclosure, the calculation module 403 is further configured to: perform channel estimation using the interference measurement reference signal, determine the correlation matrix for the reception of the interference signal based on a channel estimation value and the interference measurement parameter, and calculate the interference estimation value of the interference signal using the correlated matrix for the reception of the interference signal; or determine antenna ports for the interference measurement based on the interference measurement parameter, perform channel estimation on the antenna ports for the interference measurement using the interference measurement reference signal, determine the correlation matrix for the reception of the interference signal based on a channel estimation value, and calculate the interference estimation value of the interference signal using the correlation matrix for the reception of the interference signal.

In a possible embodiment of the present disclosure, the calculation module 403 is further configured to: perform the channel estimation using the interference measurement reference signal to acquire the channel estimation value H, determine the correlation matrix R for the transmission of the interference signal using the interference measurement parameter, determine the correlation matrix for the reception of the interference signal as $R_{rr}=HRH^H$, and calculate the interference estimation value of the interference signal using $R_{rr}$; or perform the channel estimation using the interference measurement reference signal to acquire the channel estimation value H, determine a power matrix P of the interference signal using the interference measurement parameter, determine the correlation matrix for the reception of the interference signal as $R_{rr}=HPH^H$, and calculate the interference estimation value of the interference signal using $R_{rr}$.

The calculation module 403 is further configured to determine the antenna ports for the interference measurement based on the interference measurement parameter, perform the channel estimation on the antenna ports for the interference measurement using the interference measurement reference signal to acquire the channel estimation value $H_i$, determine the correlation matrix for the reception of the interference signal as $R_{rr}=H_iH_i^H$, and calculate the interference estimation value of the interference signal using $R_{rr}$, where $(\ )^H$ represents conjugate transposition.

In a possible embodiment of the present disclosure, when determining the correlation matrix R for the transmission of the interference measurement reference signal using the interference measurement parameter, the calculation module 403 is further configured to: when the interference measurement parameter is the indication information about one matrix in the at least two $N_p*N_p$ matrices, determine the matrix indicated by the interference measurement parameter as the correlation matrix R for the transmission of the interference signal; or when the interference measurement parameter is the indication information about at least two matrices in the at least two $N_p*N_p$ matrices, determine a sum of the at least two matrices indicated by the interference measurement parameter as the correlation matrix R for the transmission of the interference signal; or when the interference measurement parameter is the indication information about n antenna ports in the $N_p$ antenna ports, construct a diagonal matrix having a dimension of $N_p$ as the correlation matrix R for the transmission of the interference signal, each of elements on each diagonal line of the diagonal matrix and corresponding to the antenna ports indicated by the interference measurement parameter having a non-zero value, and the other elements each having a value of zero; or when the interference measurement parameter is the correlation matrix for the transmission of the interference signal, determine the correlation matrix as the correlation matrix R for the transmission of the interference signal; or when the interference measurement parameter is the indication information about k vectors in $N_p$ vectors having a dimension of $N_p*1$, determine the correlation matrix for the transmission of the interference signal as $R = v_1 v_1^H + v_2 v_2^H + \ldots + v_k v_k^H$, where $v_i$ represents an ith codeword indicated by the interference measurement parameter, and i=1, 2, 3, . . . , k; or when the interference measurement parameter is the indication information about one matrix in Q matrices, determine the correlation matrix R for the transmission of the interference signal as $R = VV^H$, where V represents the matrix indicated by the interference measurement parameter; or when the interference measurement parameter is the indication information about m matrices in Q matrices, determine the correlation matrix R for the transmission of the interference signal as $R = V_1 V_1^H + \ldots + V_m V_m^H$, where $V_i$ represents an ith matrix indicated by the interference measurement parameter, i=1, . . . , m, and m is an integer greater than or equal to 2.

In a possible embodiment of the present disclosure, when determining the antenna ports for the interference measurement based on the interference measurement parameter, the calculation module 403 is further configured to: when the interference measurement parameter is the indication information about at least one matrix in at least two $N_p*N_p$ matrices, determine antenna ports corresponding to elements each having a non-zero value on each diagonal line of the matrix indicated by the interference measurement parameter as the antenna ports for the interference measurement; or when the interference measurement parameter is the indication information about n antenna ports in $N_p$ antenna ports, determine the n antenna ports indicated by the interference measurement parameter as the antenna ports for the interference measurement; or when the interference measurement parameter is the correlation matrix for the transmission of the interference measurement reference signal, determine antenna ports corresponding to elements each having a non-zero value on each diagonal line of the correlation matrix indicated by the interference measurement parameter as the antenna ports for the interference measurement; or when the interference measurement parameter is the indication information about k vectors in $N_p$ vectors having a dimension of $N_p*1$, determine antenna ports corresponding to elements each having a non-zero value in the k vectors as the antenna ports for the interference measurement; or when the interference measurement parameter is the indication information about at least one matrix in Q matrices, determine antenna ports corresponding to elements each having a non-zero value in the matrix indicated by the interference measurement parameter as the antenna ports for the interference measurement.

Figure 5:
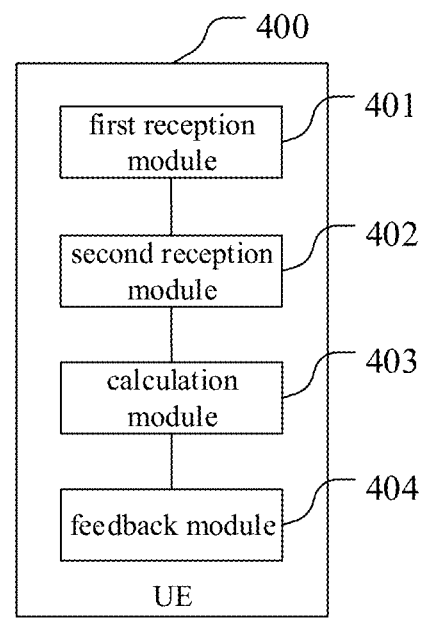
FIG. 5 is another schematic view showing the UE according to one embodiment of the present disclosure.

In a possible embodiment of the present disclosure, as shown in FIG. 5, the UE 400 may further include a feedback module 404 configured to calculate CSI based on the interference estimation value, and feedback the CSI to the network side device.

It should be appreciated that, the UE 400 in the embodiments may be capable of implementing the above-mentioned interference measurement method for the UE with a same beneficial effect, which will not be particularly defined herein.

Figure 6:
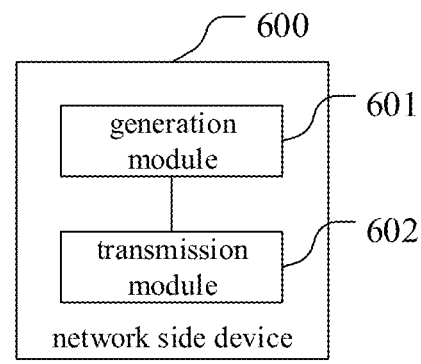
FIG. 6 is a schematic view showing a network side device according to one embodiment of the present disclosure.

The present disclosure further provides in some embodiments a network side device 600 which, as shown in FIG. 6, includes: a generation module 601 configured to generate configuration information about an interference measurement reference signal resource and an interference measurement parameter; and a transmission module 602 configured to transmit the configuration information and the interference measurement parameter to a UE, so that the UE calculates an interference estimation value of an interference signal based on the interference measurement parameter and an interference measurement reference signal.

In a possible embodiment of the present disclosure, the interference measurement parameter may be used to indicate a spatial feature and/or a strength feature of the interference signal.

In a possible embodiment of the present disclosure, the strength feature may include power information or amplitude information about the interference signal corresponding to at least one antenna port for the interference measurement reference signal.

In a possible embodiment of the present disclosure, the power information may be a ratio of power of the interference signal to power of the interference measurement reference signal, and the amplitude information may be a ratio of an amplitude of the interference signal to an amplitude of the interference measurement reference signal.

In a possible embodiment of the present disclosure, the spatial feature of the interference signal may include a correlation matrix or a precoding matrix for the transmission of the interference signal.

In a possible embodiment of the present disclosure, the correlation matrix may be a diagonal matrix, and each element on each diagonal line may have a non-zero value or has a value of zero. Merely one element in each column of the precoding matrix may have a non-zero value, and the other elements in the column may each have a value of zero.

In a possible embodiment of the present disclosure, the non-zero value may be a constant, or the non-zero value may be a value determined by the UE based on signaling from the network side device. The non-zero value in the correlation matrix may be the same as or different from the non-zero value in the precoding matrix.

In a possible embodiment of the present disclosure, the interference measurement parameter may be indication information about at least one matrix in at least two $N_p*N_p$ matrices; or the interference measurement parameter may be indication information about n antenna ports in $N_p$ antenna ports, where $0 < n \leq N_p$; or the interference measurement parameter may be the correlation matrix for the transmission of the interference signal; or the interference measurement parameter may be indication information about k vectors in $N_p$ vectors having a dimension of $N_p*1$, merely one element in each vector may have a non-zero value, the other elements in the vector may each have a value of zero, where k is an integer greater than or equal to 1; or the interference measurement parameter may be indication information about at least one matrix in Q matrices, the Q matrices may include matrices having dimensions of $N_p*1$, $N_p*2$, $N_p*3$, . . . , $N_p*Q$ respectively, $Q \leq N_p$, merely one element in each column of each matrix may have a non-zero value and the other elements in the column of the matrix may each have a value of zero, or merely one element in each column of each matrix may have a non-zero value, the other elements in the column of the matrix may each have a value of zero, merely one element in each row of each matrix may have a non-zero value, and the other elements in the row of the matrix may each have a value of zero, where $N_p$ represents the quantity of transmission antenna ports for the interference measurement reference signal.

Figure 7:
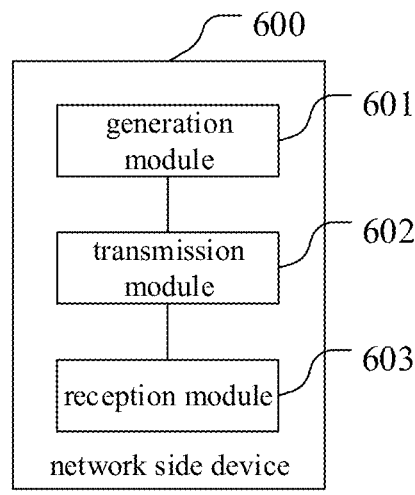
FIG. 7 is another schematic view showing the network side device according to one embodiment of the present disclosure.

In a possible embodiment of the present disclosure, as shown in FIG. 7, the network side device 600 may further include a reception module 603 configured to receive CSI from the UE, the CSI being calculated by the UE based on the interference estimation value.

Figure 8:
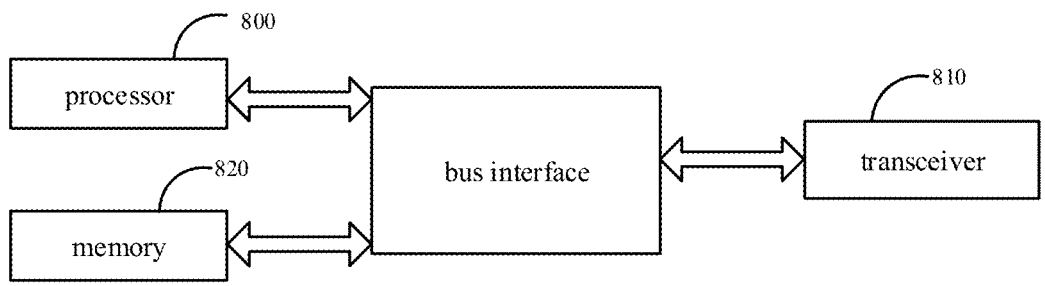
FIG. 8 is yet another schematic view showing the UE according to one embodiment of the present disclosure.

The present disclosure further provides in some embodiments a UE which, as shown in FIG. 8, includes a transceiver 810, a memory 820, a processor 800, and a computer program stored in the memory and executed by the processor. The transceiver 810 is configured to receive configuration information about an interference measurement reference signal resource and an interference measurement parameter from a network side device, receive an interference measurement reference signal on the interference measurement reference signal resource based on the configuration information, and calculate an interference estimation value of an interference signal based on the interference measurement parameter and the interference measurement reference signal; or the transceiver 810 is configured to receive configuration information about an interference measurement reference signal resource and an interference measurement parameter from a network side device and receive an interference measurement reference signal on the interference measurement reference signal resource based on the configuration information, and the processor 800 is configured to read the computer program in the memory so as to calculate an interference estimation value of an interference signal based on the interference measurement parameter and the interference measurement reference signal.

Based on the above, the calculation of the interference estimation value of the interference signal may be performed by the transceiver 810 or the processor 800 based on the interference measurement parameter and the interference measurement reference signal.

The transceiver 810 is further configured to receive and transmit data under the control of the processor 800.

In FIG. 8, bus architecture may include a number of buses and bridges connected to each other, so as to connect various circuits for one or more processors 800 and one or more memories 820. In addition, as is known in the art, the bus architecture may be used to connect any other circuits, such as a circuit for a peripheral device, a circuit for a voltage stabilizer and a power management circuit. A bus interface may be provided, and the transceiver 810 may consist of a plurality of elements, i.e., a transmitter and a receiver for communication with any other devices over a transmission medium. The processor 800 may take charge of managing the bus architecture as well as general processings. The memory 820 may store therein data for the operation of the processor 800.

It should be appreciated that, the memory 820 may not be limited to be located in the UE, and it may be located at a geographical position different from the processor 800.

In a possible embodiment of the present disclosure, the interference measurement parameter may be used to indicate a spatial feature and/or a strength feature of the interference signal.

In a possible embodiment of the present disclosure, the strength feature may include power information or amplitude information about the interference signal corresponding to at least one antenna port for the interference measurement reference signal.

In a possible embodiment of the present disclosure, the power information may be a ratio of power of the interference signal to power of the interference measurement reference signal, and the amplitude information may be a ratio of an amplitude of the interference signal to an amplitude of the interference measurement reference signal.

In a possible embodiment of the present disclosure, the spatial feature of the interference signal may include a correlation matrix or a precoding matrix for the transmission of the interference signal.

In a possible embodiment of the present disclosure, the correlation matrix may be a diagonal matrix, and each element on each diagonal line may have a non-zero value or have a value of zero. Merely one element in each column of the precoding matrix may have a non-zero value, and the other elements in the column may each have a value of zero.

In a possible embodiment of the present disclosure, the non-zero value may be a constant, or the non-zero value may be a value determined by the UE based on signaling from the network side device. The non-zero value in the correlation matrix may be the same as or different from the non-zero value in the precoding matrix.

In a possible embodiment of the present disclosure, the interference measurement parameter may be indication information about at least one matrix in at least two $N_p*N_p$ matrices; or the interference measurement parameter may be indication information about n antenna ports in $N_p$ antenna ports, where $0<n\leq N_p$; or the interference measurement parameter may be the correlation matrix for the transmission of the interference signal; or the interference measurement parameter may be indication information about k vectors in $N_p$ vectors having a dimension of $N_p*1$, merely one element in each vector may have a non-zero value, the other elements in the vector may each have a value of zero, where k is an integer greater than or equal to 1; or the interference measurement parameter may be indication information about at least one matrix in Q matrices, the Q matrices may include matrices having dimensions of $N_p*1$, $N_p*2$, $N_p*3$, . . . , $N_p*Q$ respectively, $Q\leq N_p$, merely one element in each column of each matrix may have a non-zero value and the other elements in the column of the matrix may each have a value of zero, or merely one element in each column of each matrix may have a non-zero value, the other elements in the column of the matrix may each have a value of zero, merely one element in each row of each matrix may have a non-zero value, and the other elements in the row of the matrix may each have a value of zero, where Np represents the quantity of transmission antenna ports for the interference measurement reference signal.

In a possible embodiment of the present disclosure, when calculating the interference estimation value of the interference signal based on the interference measurement parameter and the interference measurement reference signal, the transceiver 810 or the processor 800 is further configured to determine a correlation matrix for the reception of the interference signal based on the interference measurement parameter and the interference measurement reference signal, and calculate the interference estimation value of the interference signal using the correlation matrix for the reception of the interference signal.

In a possible embodiment of the present disclosure, when determining the correlation matrix for the reception of the interference signal based on the interference measurement parameter and the interference measurement reference signal and calculating the interference estimation value of the interference signal using the correlation matrix for the reception of the interference signal, the transceiver 810 or the processor 800 is further configured to determine the correlation matrix for the reception of the interference signal on each subcarrier or RE within a measurement bandwidth based on the interference measurement parameter and the interference measurement reference signal, perform an averaging operation on the correlation matrices for the reception of the interference signal on all the subcarriers or REs within the measurement bandwidth, and calculate the interference estimation value of the interference signal based on a result of the averaging operation.

In a possible embodiment of the present disclosure, when determining the correlation matrix for the reception of the interference signal based on the interference measurement parameter and the interference measurement reference signal and calculating the interference estimation value of the interference signal using the correlation matrix for the reception of the interference signal, the transceiver 810 or the processor 800 is further configured to: perform channel estimation using the interference measurement reference signal, determine the correlation matrix for the reception of the interference signal based on a channel estimation value and the interference measurement parameter, and calculate the interference estimation value of the interference signal using the correlated matrix for the reception of the interference signal; or determine antenna ports for the interference measurement based on the interference measurement parameter, perform channel estimation on the antenna ports for the interference measurement using the interference measurement reference signal, determine the correlation matrix for the reception of the interference signal based on a channel estimation value, and calculate the interference estimation value of the interference signal using the correlation matrix for the reception of the interference signal.

In a possible embodiment of the present disclosure, when performing the channel estimation using the interference measurement reference signal, determining the correlation matrix for the reception of the reference signal based on the channel estimation value and the interference measurement parameter, and calculating the interference estimation value of the interference signal using the correlation matrix for the reception of the interference signal, the transceiver 810 or the processor 800 is further configured to: perform the channel estimation using the interference measurement reference signal to acquire the channel estimation value H, determine the correlation matrix R for the transmission of the interference signal using the interference measurement parameter, determine the correlation matrix for the reception of the interference signal as $R_{rr}=HRH^H$, and calculate the interference estimation value of the interference signal using $R_{rr}$, or perform the channel estimation using the interference measurement reference signal to acquire the channel estimation value H, determine a power matrix P of the interference signal using the interference measurement parameter, determine the correlation matrix for the reception of the interference signal as $R_{rr}=HPH^H$, and calculate the interference estimation value of the interference signal using $R_{rr}$.

When determining the antenna ports for the interference measurement based on the interference measurement parameter, performing the channel estimation on the antenna ports for the interference measurement using the interference measurement reference signal, determining the correlation matrix for the reception of the interference signal based on the channel estimation value and calculating the interference estimation value of the interference signal using the correlation matrix for the reception of the interference signal, the transceiver 810 or the processor 800 is further configured to determine the antenna ports for the interference measurement based on the interference measurement parameter, perform the channel estimation on the antenna ports for the interference measurement using the interference measurement reference signal to acquire the channel estimation value $H_i$, determine the correlation matrix for the reception of the interference signal as $R_{rr}=H_iH_i^H$, and calculate the interference estimation value of the interference signal using $R_{rr}$, where $(\ )^H$ represents conjugate transposition.

In a possible embodiment of the present disclosure, when determining the correlation matrix R for the transmission of the interference measurement reference signal using the interference measurement parameter, the transceiver 810 or the processor 800 is further configured to: when the interference measurement parameter is the indication information about one matrix in the at least two $N_p*N_p$ matrices, determine the matrix indicated by the interference measurement parameter as the correlation matrix R for the transmission of the interference signal; or when the interference measurement parameter is the indication information about at least two matrices in the at least two $N_p*N_p$ matrices, determine a sum of the at least two matrices indicated by the interference measurement parameter as the correlation matrix R for the transmission of the interference signal; or when the interference measurement parameter is the indication information about n antenna ports in the $N_p$ antenna ports, construct a diagonal matrix having a dimension of $N_p$ as the correlation matrix R for the transmission of the interference signal, each of elements on each diagonal line of the diagonal matrix and corresponding to the antenna ports indicated by the interference measurement parameter having a non-zero value, and the other elements each having a value of zero; or when the interference measurement parameter is the correlation matrix for the transmission of the interference signal, determine the correlation matrix as the correlation matrix R for the transmission of the interference signal; or when the interference measurement parameter is the indication information about k vectors in $N_p$ vectors having a dimension of $N_p*1$, determine the correlation matrix for the transmission of the interference signal as $R=v_1v_1^H+v_2v_2^H+\ldots+v_kv_k^H$, where $v_i$ represents an ith codeword indicated by the interference measurement parameter, and i=1, 2, 3, . . . , k; or when the interference measurement parameter is the indication information about one matrix in Q matrices, determine the correlation matrix R for the transmission of the interference signal as $R=VV^H$, where V represents the matrix indicated by the interference measurement parameter; or when the interference measurement parameter is the indication information about m matrices in Q matrices, determine the correlation matrix R for the transmission of the interference signal as $R=V_1V_1^H+\ldots+V_mV_m^H$, where $V_i$ represents an ith matrix indicated by the interference measurement parameter, i=1, . . . , m, and m is an integer greater than or equal to 2.

In a possible embodiment of the present disclosure, when determining the antenna ports for the interference measurement based on the interference measurement parameter, the transceiver 810 or the processor 800 is further configured to: when the interference measurement parameter is the indication information about at least one matrix in at least two $N_p*N_p$ matrices, determine antenna ports corresponding to elements each having a non-zero value on each diagonal line of the matrix indicated by the interference measurement parameter as the antenna ports for the interference measurement; or when the interference measurement parameter is the indication information about n antenna ports in $N_p$ antenna ports, determine the n antenna ports indicated by the interference measurement parameter as the antenna ports for the interference measurement; or when the interference measurement parameter is the correlation matrix for the transmission of the interference measurement reference signal, determine antenna ports corresponding to elements each having a non-zero value on each diagonal line of the correlation matrix indicated by the interference measurement parameter as the antenna ports for the interference measurement; or when the interference measurement parameter is the indication information about k vectors in $N_p$ vectors having a dimension of $N_p*1$, determine antenna ports corresponding to elements each having a non-zero value in the k vectors as the antenna ports for the interference measurement; or when the interference measurement parameter is the indication information about at least one matrix in Q matrices, determine antenna ports corresponding to elements each having a non-zero value in the matrix indicated by the interference measurement parameter as the antenna ports for the interference measurement.

In a possible embodiment of the present disclosure, the transceiver 810 is further configured to calculate CSI based on the interference estimation value, and transmit the CSI to the network side device; or the processor 800 is further configured to calculate the CSI based on the interference estimation value, and the transceiver 810 is further configured to feedback the CSI to the network side device.

It should be appreciated that, the UE in the embodiments may be capable of implementing the above-mentioned interference measurement method with a same beneficial effect, which will not be particularly defined herein.

Figure 9:
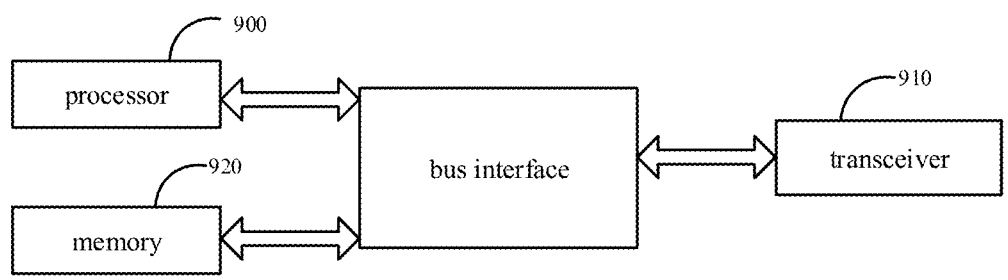
FIG. 9 is yet another schematic view showing the network side device according to one embodiment of the present disclosure.

The present disclosure further provides in some embodiments a network side device which, as shown in FIG. 9, includes a transceiver 910, a memory 920, a processor 900, and a computer program stored in the memory and executed by the processor. The processor 900 is configured to read a program stored in the memory 920, so as to generate configuration information about an interference measurement reference signal resource and an interference measurement parameter. The transceiver 910 is configured to transmit the configuration information and the interference measurement parameter to a UE, so that the UE calculates an interference estimation value of an interference signal based on the interference measurement parameter and an interference measurement reference signal. The transceiver 910 is further configured to receive and transmit data under the control of the processor 900.

In FIG. 9, bus architecture may include a number of buses and bridges connected to each other, so as to connect various circuits for one or more processors 900 and one or more memories 920. In addition, as is known in the art, the bus architecture may be used to connect any other circuits, such as a circuit for a peripheral device, a circuit for a voltage stabilizer and a power management circuit. A bus interface may be provided, and the transceiver 910 may consist of a plurality of elements, i.e., a transmitter and a receiver for communication with any other devices over a transmission medium. The processor 900 may take charge of managing the bus architecture as well as general processings. The memory 920 may store therein data for the operation of the processor 900.

It should be appreciated that, the memory 920 may not be limited to be located in the UE, and instead, it may be located at a geographical positon different from the processor 900.

In a possible embodiment of the present disclosure, the interference measurement parameter may be used to indicate a spatial feature and/or a strength feature of the interference signal.

In a possible embodiment of the present disclosure, the strength feature may include power information or amplitude information about the interference signal corresponding to at least one antenna port for the interference measurement reference signal.

In a possible embodiment of the present disclosure, the power information may be a ratio of power of the interference signal to power of the interference measurement reference signal, and the amplitude information may be a ratio of an amplitude of the interference signal to an amplitude of the interference measurement reference signal.

In a possible embodiment of the present disclosure, the spatial feature of the interference signal may include a correlation matrix or a precoding matrix for the transmission of the interference signal.

In a possible embodiment of the present disclosure, the correlation matrix may be a diagonal matrix, and each element on each diagonal line may have a non-zero value or has a value of zero. Merely one element in each column of the precoding matrix may have a non-zero value, and the other elements in the column may each have a value of zero.

In a possible embodiment of the present disclosure, the non-zero value may be a constant, or the non-zero value may be a value determined by the UE based on signaling from the network side device. The non-zero value in the correlation matrix may be the same as or different from the non-zero value in the precoding matrix.

In a possible embodiment of the present disclosure, the interference measurement parameter may be indication information about at least one matrix in at least two $N_p*N_p$ matrices; or the interference measurement parameter may be indication information about n antenna ports in $N_p$ antenna ports, where $0<n\le N_p$; or the interference measurement parameter may be the correlation matrix for the transmission of the interference signal; or the interference measurement parameter may be indication information about k vectors in $N_p$ vectors having a dimension of $N_p*1$, merely one element in each vector may have a non-zero value, the other elements in the vector may each have a value of zero, where k is an integer greater than or equal to 1; or the interference measurement parameter may be indication information about at least one matrix in Q matrices, the Q matrices may include matrices having dimensions of $N_p*1$, $N_p*2$, $N_p*3, \ldots, N_p*Q$ respectively, $Q \le N_p$, merely one element in each column of each matrix may have a non-zero value and the other elements in the column of the matrix may each have a value of zero, or merely one element in each column of each matrix may have a non-zero value, the other elements in the column of the matrix may each have a value of zero, merely one element in each row of each matrix may have a non-zero value, and the other elements in the row of the matrix may each have a value of zero, where $N_p$ represents the quantity of transmission antenna ports for the interference measurement reference signal.

In a possible embodiment of the present disclosure, the transceiver 910 is further configured to receive CSI from the UE, the CSI being calculated by the UE based on the interference estimation value.

It should be appreciated that, the network side device in the embodiments of the present disclosure may be capable of implementing the above-mentioned interference measurement method for the network side device with a same beneficial effect, which will thus not be particularly defined herein.

The present disclosure further provides in some embodiments a computer-readable storage medium storing therein a computer program. The computer program may be executed by a processor so as to implement the above-mentioned interference measurement method for the UE.

The present disclosure further provides in some embodiments a computer-readable storage medium storing therein a computer program. The computer program may be executed by a processor so as to implement the abovementioned interference measurement method for the network side device.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An interference measurement method, comprising:
   receiving, by a User Equipment (UE), configuration information about an interference measurement reference signal resource and an interference measurement parameter from a network side device;
   receiving, by the UE, an interference measurement reference signal on the interference measurement reference signal resource based on the configuration information; and
   calculating, by the UE, an interference estimation value of an interference signal based on the interference measurement parameter and the interference measurement reference signal;
   wherein
   the interference measurement parameter is indication information about at least one matrix in at least two $N_p*N_p$ matrices; or
   the interference measurement parameter is indication information about n antenna ports in $N_p$ antenna ports, the n antenna ports indicated by the interference measurement parameter are determined as antenna ports for the interference measurement, the indication information about n antenna ports identifies specific antenna ports which are used for the interference measurement, where $0<n\leq N_p$; or
   the interference measurement parameter is indication information about k vectors in $N_p$ vectors having a dimension of $N_p*1$, merely one element in each vector having a non-zero value, the other elements in the vector each having a value of zero, where k is an integer greater than or equal to 1; or
   the interference measurement parameter is indication information about at least one matrix in Q matrices, the Q matrices comprising matrices having dimensions of $N_p*1$, $N_p*2$, $N_p*3$, . . . , $N_p*Q$ respectively, $Q\leq N_p$, merely one element in each column of each matrix having a non-zero value and the other elements in the column of the matrix having a value of zero, or merely one element in each column of each matrix having a non-zero value, the other elements in the column of the matrix having a value of zero, and merely one element in each row of each matrix having a non-zero value, and the other elements in the row of the matrix having a value of zero,
   wherein Np represents the quantity of transmission antenna ports for the interference measurement reference signal;
   wherein the calculating, by the UE, the calculating, by the UE, the interference estimation value of the interference signal based on the interference measurement parameter and the interference measurement reference signal comprises:
   determining, by the UE, a correlation matrix for the reception of the interference signal based on the interference measurement parameter and the interference measurement reference signal, and calculating the interference estimation value of the interference signal using the correlation matrix for the reception of the interference signal.

2. The interference measurement method according to claim 1, wherein the interference measurement parameter is used to indicate a spatial feature and/or a strength feature of the interference signal.

3. The interference measurement method according to claim 2, wherein the strength feature comprises power information or amplitude information about the interference signal corresponding to at least one antenna port for the interference measurement reference signal,
   wherein the power information is a ratio of power of the interference signal to power of the interference measurement reference signal, and the amplitude information is a ratio of an amplitude of the interference signal to an amplitude of the interference measurement reference signal.

4. The interference measurement method according to claim 2, wherein the spatial feature of the interference signal comprises a correlation matrix or a precoding matrix for the transmission of the interference signal.

5. The interference measurement method according to claim 4, wherein the correlation matrix is a diagonal matrix, and each element on each diagonal line has a non-zero value or has a value of zero, wherein merely one element in each column of the precoding matrix has a non-zero value, and the other elements in the column each have a value of zero.

6. The interference measurement method according to claim 5, wherein the non-zero value is a constant, or the non-zero value is a value determined by the UE based on signaling from the network side device, wherein the non-zero value in the correlation matrix is the same as or different from the non-zero value in the precoding matrix.

7. The interference measurement method according to claim 1, wherein the determining, by the UE, the correlation matrix for the reception of the interference signal based on the interference measurement parameter and the interference measurement reference signal and calculating the interference estimation value of the interference signal using the correlation matrix for the reception of the interference signal comprises:

determining, by the UE, the correlation matrix for the reception of the interference signal on each subcarrier or Resource Element (RE) within a measurement bandwidth based on the interference measurement parameter and the interference measurement reference signal, performing an averaging operation on the correlation matrices for the reception of the interference signal on all the subcarriers or REs within the measurement bandwidth, and calculating the interference estimation value of the interference signal based on a result of the averaging operation; or performing, by the UE, channel estimation using the interference measurement reference signal, determining the correlation matrix for the reception of the interference signal based on a channel estimation value and the interference measurement parameter, and calculating the interference estimation value of the interference signal using the correlated matrix for the reception of the interference signal; or determining, by the UE, antenna ports for the interference measurement based on the interference measurement parameter, performing channel estimation on the antenna ports for the interference measurement using the interference measurement reference signal, determining the correlation matrix for the reception of the interference signal based on a channel estimation value, and calculating the interference estimation value of the interference signal using the correlation matrix for the reception of the interference signal.

8. The interference measurement method according to claim 1, further comprising calculating Channel State Information (CSI) based on the interference estimation value, and feeding back the CSI to the network side device.

9. A UE, comprising a transceiver, a memory, a processor, and a computer program stored in the memory and executed by the processor, wherein the processor is configured to execute the computer program so as to implement the interference measurement method according to claim 1.

\* \* \* \* \*